US009942871B2

(12) United States Patent
Lee et al.

(10) Patent No.: US 9,942,871 B2
(45) Date of Patent: Apr. 10, 2018

(54) METHOD AND APPARATUS FOR MEASURING LOCATION OF DEVICE BY USING BLUETOOTH LOW ENERGY (LE) TECHNIQUE

(71) Applicant: LG ELECTRONICS INC., Seoul (KR)

(72) Inventors: Minsoo Lee, Seoul (KR); Younghwan Kwon, Seoul (KR); Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,466

(22) PCT Filed: Jul. 14, 2015

(86) PCT No.: PCT/KR2015/007313
§ 371 (c)(1),
(2) Date: Jan. 13, 2017

(87) PCT Pub. No.: WO2016/010347
PCT Pub. Date: Jan. 21, 2016

(65) Prior Publication Data
US 2017/0208564 A1    Jul. 20, 2017

Related U.S. Application Data

(60) Provisional application No. 62/024,442, filed on Jul. 14, 2014.

(51) Int. Cl.
*H04W 4/02* (2009.01)
*H04W 64/00* (2009.01)
*H04W 4/00* (2018.01)

(52) U.S. Cl.
CPC ......... *H04W 64/003* (2013.01); *H04W 4/008* (2013.01)

(58) Field of Classification Search
CPC ..... H04W 64/003; H04W 4/008; H04W 4/04; H04W 64/00; H04W 88/02; H04W 76/02; H04W 76/023; G01S 3/46
(Continued)

(56) References Cited

U.S. PATENT DOCUMENTS

2007/0293237 A1* 12/2007 Correal ................ H04W 4/02
455/456.1
2009/0264137 A1* 10/2009 Soliman ............... G01S 5/0072
455/456.1
(Continued)

FOREIGN PATENT DOCUMENTS

KR       101037435         5/2011
WO      2010/131837       11/2010
(Continued)

OTHER PUBLICATIONS

International Application No. PCT/KR2015/007313, Search Report dated Oct. 27, 2015, 10 pages.

*Primary Examiner* — Nathan Taylor
(74) *Attorney, Agent, or Firm* — Lee Hong Degerman Kang & Waimey

(57) ABSTRACT

The present invention relates to a method and an apparatus for estimating, by a third device, a location of a first device by using a Bluetooth low energy (LE) technique. The present invention provides a method and an apparatus, the method comprising the steps of: receiving, from the third device, a location measurement request message for requesting a measurement of the location of the first device; transmitting, to the first device, a first request message for requesting location information relating to the location of the first device; receiving, from the first device, a first response
(Continued)

message including the location information as a response to the request message; estimating location value information indicating the location of the first device on the basis of the location information; and transmitting, to the third device, a location measurement response message including the estimated location value information.

16 Claims, 26 Drawing Sheets

(58) Field of Classification Search
USPC .......................................... 455/456.1–456.5
See application file for complete search history.

(56) References Cited

U.S. PATENT DOCUMENTS

| | | | | |
|---|---|---|---|---|
| 2012/0257604 | A1* | 10/2012 | Honkanen | H04W 4/023 370/338 |
| 2012/0258669 | A1* | 10/2012 | Honkanen | G01S 3/46 455/67.11 |
| 2012/0289243 | A1* | 11/2012 | Tarlow | G01S 5/0072 455/456.1 |
| 2012/0309309 | A1* | 12/2012 | Cho | H04W 76/023 455/41.1 |
| 2013/0029685 | A1* | 1/2013 | Moshfeghi | G01S 19/48 455/456.1 |
| 2013/0188538 | A1* | 7/2013 | Kainulainen | G01S 3/48 370/310 |
| 2013/0321209 | A1* | 12/2013 | Kalliola | G01S 5/02 342/419 |
| 2014/0148196 | A1* | 5/2014 | Bassan-Eskenazi | G01S 11/02 455/456.1 |
| 2015/0005011 | A1* | 1/2015 | Nehrenz | H04W 4/02 455/456.3 |
| 2015/0092663 | A1* | 4/2015 | Cho | H04W 76/023 370/315 |
| 2015/0094097 | A1* | 4/2015 | Fraccaroli | H04W 4/021 455/456.3 |
| 2015/0105103 | A1* | 4/2015 | Dackefjord | G01S 3/02 455/456.2 |
| 2015/0124696 | A1* | 5/2015 | Kwon | H04L 41/12 370/315 |
| 2015/0185309 | A1* | 7/2015 | Pu | G01S 13/878 455/456.1 |
| 2015/0319579 | A1* | 11/2015 | Syrjarinne | G01C 21/20 455/456.1 |
| 2016/0036958 | A1* | 2/2016 | Logan | G05B 19/042 455/414.1 |
| 2016/0105761 | A1* | 4/2016 | Polo | H04W 4/008 455/41.2 |
| 2016/0165397 | A1* | 6/2016 | Yang | H04W 64/00 455/456.5 |
| 2016/0327631 | A1* | 11/2016 | Salokannel | G01S 5/12 |
| 2017/0070916 | A1* | 3/2017 | Cho | H04W 76/023 |
| 2017/0160800 | A1* | 6/2017 | Reunamaki | G06F 3/013 |

FOREIGN PATENT DOCUMENTS

| | | |
|---|---|---|
| WO | 2011/059188 | 5/2011 |
| WO | 2011/105695 | 9/2011 |
| WO | 2014/051237 | 4/2014 |

* cited by examiner

FIG. 16

| Characteristic Name | Property | Length of the field | Mandatory Properties |
|---|---|---|---|
| Length | M | 1 octet | |
| AD-type: Service Data | M | 1 octet | |
| Indoor Positioning Server UUID | M | 2 octets | |
| Flags | M | 1 octet | |
| Coordinates (East) | M | 2 or 4 octets | |
| Coordinates (North) | M | 2 or 4 octets | |
| Tx Power | M | 1 octet | |
| Floor Number | O | 1 octet | |
| Altitude | O | 2 octets | |
| Uncertainty | O | 1 octet | |
| Control Point | | | |
| Interval of LL_AoA_REQ | M | 1 octet | |
| List of Tag IDs | O | 2 or 4 octets | |
| Device State | M | 1 octet | Read, Write, Indication |
| Advertising Duration | O | 1 octet | Read, Write |
| Scanning Duration | O | 1 octet | Read, Write |
| Standby Duration | O | 1 octet | Read, Write |
| Initiating Duration | O | 1 octet | Read, Write |
| Connection Duration | O | 1 octet | Read, Write |
| Advertising Type | O | 1 octet | Read, Write |
| | | 1 octet | |
| Supported Scanning | O | 1 octet | Read, Write |
| Locator Control Point | M | 1 octet | Write, Indication |
| Connection Status | O | 1 octet | Read, Indication |
| WhiteList | O | 1 octet | Read, Write, Indication |
| WhiteList Control Point | O | 1 octet | Read, Write, Indication |
| Bondable | O | 1 octet | Read, Write |
| Security | O | 1 octet | Read, Write |

FIG. 17

| 0x01 | 0x02 | 0x03 | 0x04 | 0x05 | 0x06 | 0x07 | 0x08 | 0x09 | 0x0A |
|---|---|---|---|---|---|---|---|---|---|
| Execute | Advertising Start | Advertising Stop | Scanning Start | Scanning Stop | Connecting Request | Connecting Stop | Refresh Bonding | Refresh Security | Update Interval |

FIG. 20

| Advertising Channel Packet Header | Requester Address | AdvAdd | Control | Control Data | Requesting Information |

(a) INFORMATION REQUEST PACKET

| Advertising Channel Packet Header | AdvAdd | Control | BroadCast Data |

| Bost interval | Bost channels | Mode | Bost TxPower | Operation Response | Target_Tag ID | Determined Interval |

| 0x01 | 0x02 | 0x03 | 0x04 | 0x05 | 0x06 | 0x07 | 0x08 | 0x09 |
| Execute | Advertising Start | Advertising Stop | Scanning Start | Scanning Stop | Connecting Request | Connecting Stop | Refresh Bonding | Refresh Security |

(b) INFORMATION RESPONSE PACKET

FIG. 22

(a) HCI REQUEST COMMAND

| Command | OCF | Command Parameters | Return Parameters |
|---|---|---|---|
| HCI_LE_Send_AoA_Request | TBD | Connection_Handle, Requested_Extension_Length | Status |
| HCI_LE_Send_AoA_Request_Interval | TBD | Connection_Handle, Requested_Extension_Length, Requested_Interval | Status |
| HCI_LE_Send_AoA_Request_Whitelist_Add | TBD | Connection_Handle, Requested_Extension_Length, TagID (to be added to Whitelist) | Status |
| HCI_LE_Send_AoA_Request_Whitelist_Remove | TBD | Connection_Handle, Requested_Extension_Length, TagID (to be removed from Whitelist) | Status |

(b) HCI REPORT COMMAND

| Event | Event Code | Event Parameters |
|---|---|---|
| HCI_LE_AoA_Report_Event | TBD | Subevent_Code, Connection_Handle, RSSI, Frequency_Offset, Sample_Length, I_Sample[i], Q_Sample[i], Next_Update |
| HCI_LE_AoA_Report_Event_Whitelist | TBD | Opcode (01: Tag ID Added 02: TagID Deleted ) Updated Tag ID in Whitelist |

FIG. 23

| Name | Property | Length of the field |
|---|---|---|
| Length | M | 1 octet |
| AD-type: Service Data | M | 1 octet |
| High Accuracy Asset Tracking UUID | M | 2 octets |
| LE AoA Enable | M | 1 octet |
| Tag Types | M | 2 or 4 octets |
| Device Manufacturer | M | 2 or 4 octets |
| Tag ID/MAC | O | octet |
| Battery Power | O | 1 octet |
| Tag Image | O | 2 octets |
| Tag Owner Name | O | 1 octet |
| Tag Owner ID | O | 1 octet |
| Tag Retailer (Operator, Tag MANAGER) | O | 1 octet |

FIG. 24

| Current Device State | Peer Device | Connected Tech Type | Service Type | Security | Group Info | Battery Information |
|---|---|---|---|---|---|---|
| 8 bits integer | BT Address (48 bits) or BT Friendly Name (String) | TECHNIQUE USED FOR CONNECTION (BLE) | SERVICE TYPE USED IN CONNECTION (BT SERVICE OR APPLICATION SERVICE (APPLICATION), ETC.) | SECURITY STATE OF CURRENT CONNECTION (AUTHENTICATION), ETC.) | GROUP ID, GROUP OWNER ETC. | BATTERY STATE OF TAG |

FIG. 26

| Command | OCF | Command Parameters | Return Parameters |
|---|---|---|---|
| HCI_LE_AoA_Disable | TBD | Connection_Handle, Disable | Status |
| HCI_LE_AoA_Enable | TBD | Connection_Handle, Enable | Status |
| HCI_LE_AoA_Update_Interval | TBD | Connection_Handle, Update_Interval | Status |

(a) HCI COMMAND

| Command | OCF | Command Parameters | Return Parameters |
|---|---|---|---|
| HCI_LE_Set_AoA_Parameters | TBD | Adv_Interval_Min, Adv_Interval_Max, Own_Address_Type, Adv_Channels, Extension_Type, Extension_Length, Battery_Status_Indicator | Status |

(b) HCI SETTING COMMAND

METHOD AND APPARATUS FOR MEASURING LOCATION OF DEVICE BY USING BLUETOOTH LOW ENERGY (LE) TECHNIQUE

CROSS-REFERENCE TO RELATED APPLICATIONS

This application is the National Stage filing under 35 U.S.C. 371 of International Application No. PCT/KR2015/007313, filed on Jul. 14, 2015, which claims the benefit of U.S. Provisional Application No. 62/024,442, filed on Jul. 14, 2014, the contents of which are all hereby incorporated by reference herein in their entirety.

TECHNICAL FIELD

The present invention relates to measurement of a location of a device using Bluetooth, a short-range technology in a wireless communication system, and more particularly, to a method and apparatus for measuring a location of a device using a Bluetooth low energy (BLE) technique.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An aspect of the present invention provides a method for estimating a location of a device using a Bluetooth low energy (BLE) technique.

Another aspect of the present invention provides a method for estimating a location of a device by calculating an angle through a multi-antenna scheme using a BLE technique.

Another aspect of the present invention provides a method for a third device to estimate a location of another device by controlling a location estimating device using a BLE technique.

Another aspect of the present invention provides a method for a third device to select another device whose location is to be estimated by controlling a location estimating device using a BLE technique.

Another aspect of the present invention provides a method for a third device to search for another device whose location may be estimated by controlling a location estimating device using a BLE technique.

Another aspect of the present invention provides a method for a third device to set a location estimation period of another device by controlling a location estimating device using a BLE technique.

Another aspect of the present invention provides a method for a third device to set a location estimating method of another device by controlling a location estimating device using a BLE technique.

Another aspect of the present invention provides a method for a third device to obtain information of another device and a location estimating device using a BLE technique.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present invention, there is provided a method for estimating a location of a device using a Bluetooth low energy (BLE) technique.

In detail, a method for estimating a location of a device using a Bluetooth low energy (BLE) technique according to an embodiment of the present invention includes: receiving a location measurement request message requesting measurement of a location of the first device from the third device; transmitting a first request message requesting location information related to a location of the first device to the first device; receiving a first response message including the location information as a response with respect to the request message from the first device; estimating location value information indicating a location of the first device on the basis of the location information; and transmitting a location measurement response message including the estimated location value information to the third device, wherein the location value information includes at least any one of latitude information, longitude information, and altitude information of the first device, and transmission signal strength information indicating strength of a transmitted signal.

Also, in the present invention, the location measurement request message may include at least one of ID information indicating the first device, address information, and type information indicating a type of the first device.

Also, in the present invention, the method may further include: transmitting a connection request message for Bluetooth connection to the first device; and establishing the Bluetooth connection with the first device on the basis of the connection request message.

Also, in the present invention, the location measurement request message may be transmitted in a unicast or broadcast manner.

Also, in the present invention, the method may further include: when the location measurement request message is transmitted in the unicast manner, receiving a connection request message for Bluetooth connection from the third device; and establishing Bluetooth connection with the third device on the basis of the connection request message.

Also, in the present invention, the method may further include: receiving a control message for requesting the second device to perform a specific operation, from the third device; performing the specific operation on the basis of the control message; and transmitting a second response message as a response with respect to the control message to the third device.

Also, in the present invention, the specific operation may be setting an interval at which the request message is transmitted.

Also, in the present invention, the method may further include: receiving a second request message requesting connection information or state information of the second device from the third device; and transmitting a second response message including at least one of the connection information or state information as a response with respect to the second request message to the third device.

Also, in the present invention, the method may further include: receiving a control message for requesting the first device to perform a specific operation from the third device; and transmitting the control message to the first device.

In another aspect of the present invention, there is provided a device including: a communication unit communicating with the outside wirelessly or wiredly; and a processor functionally connected to the communication unit, wherein the processor may perform control to receive a location measurement request message requesting measurement of a location of the first device from the third device, transmit a first request message requesting location information related to a location of the first device to the first device, receive a first response message including the location information as a response with respect to the request message from the first device, estimate location value information indicating a location of the first device on the basis of the location information, and transmit a location measurement response message including the estimated location value information to the third device, wherein the location value information includes at least any one of latitude information, longitude information, and altitude information of the first device, and transmission signal strength information indicating strength of a transmitted signal.

Also, in the present invention, the location measurement request message may include at least one of ID information indicating the first device, address information, and type information indicating a type of the first device.

Also, in the present invention, the processor may perform control to transmit a connection request message for Bluetooth connection to the first device and establish the Bluetooth connection with the first device on the basis of the connection request message.

Also, in the present invention, the location measurement request message may be transmitted in a unicast or broadcast manner.

Also, in the present invention, when the location measurement request message is transmitted in the unicast manner, the processor may perform control to receive a connection request message for Bluetooth connection from the third device and establish Bluetooth connection with the third device on the basis of the connection request message.

Also, in the present invention, the processor may perform control to receive a control message for requesting the second device to perform a specific operation, from the third device, perform the specific operation on the basis of the control message, and transmit a second response message as a response with respect to the control message to the third device.

Also, in the present invention, the specific operation may be setting an interval at which the request message is transmitted.

Also, in the present invention, the processor may perform control to receive a second request message requesting connection information or state information of the second device from the third device and transmit a second response message including at least one of the connection information or state information as a response with respect to the second request message to the third device.

Also, in the present invention, the processor may perform control to receive a control message for requesting the first device to perform a specific operation from the third device and transmit the control message to the first device.

Advantageous Effects

In a method for estimating a location of a device using a BLE technique according to an embodiment of the present invention, since an angle is calculated using a multi-antenna scheme, a location of a device may be accurately estimated.

Also, according to the present invention, a third device may estimate a location of another device through a location measuring device using a BLE technique.

Also, according to the present invention, a third device may select another device whose location is to be estimated by controlling a location measuring device using a BLE technique.

Also, according to the present invention, a third device may search for devices whose location may be estimated by a location estimating device using a BLE technique.

Also, according to the present invention, a third device may set a location estimation period by controlling a location estimating device using a BLE technique.

Also, according to the present invention, a third device may set a location estimating method by controlling a location estimating device.

Also, according to the present invention, a third device may obtain information of a device and a location estimating device using a BLE technique.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

FIGS. 15 and 16 are views illustrating an example of a generic attribute profile (GATT) for a third device to control a PHD and obtain information using a BLE technique proposed in this disclosure.

FIG. 17 is a view illustrating an example of a control point for a third device to control a PHD using a BLE technique proposed in this disclosure.

FIGS. 18 to 20 are views illustrating an example of a method for a third device to control a PHD using a BLE technique proposed in this disclosure and a data format.

FIGS. 21 and 22 are views illustrating an example of a method for a third device to control a PHD using a BLE technique proposed in this disclosure and a host controller interface (HCI) command.

FIG. 23 is a view illustrating an example of characteristics of a positioning client device (PCD) proposed in this disclosure.

FIG. 24 is a view illustrating an example of an indication for providing state information of a PHD proposed in this disclosure.

FIGS. 25 and 26 are views illustrating an example of a method for a third device to control a PCD using a BLE technique proposed in this disclosure, and a data format.

BEST MODES

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
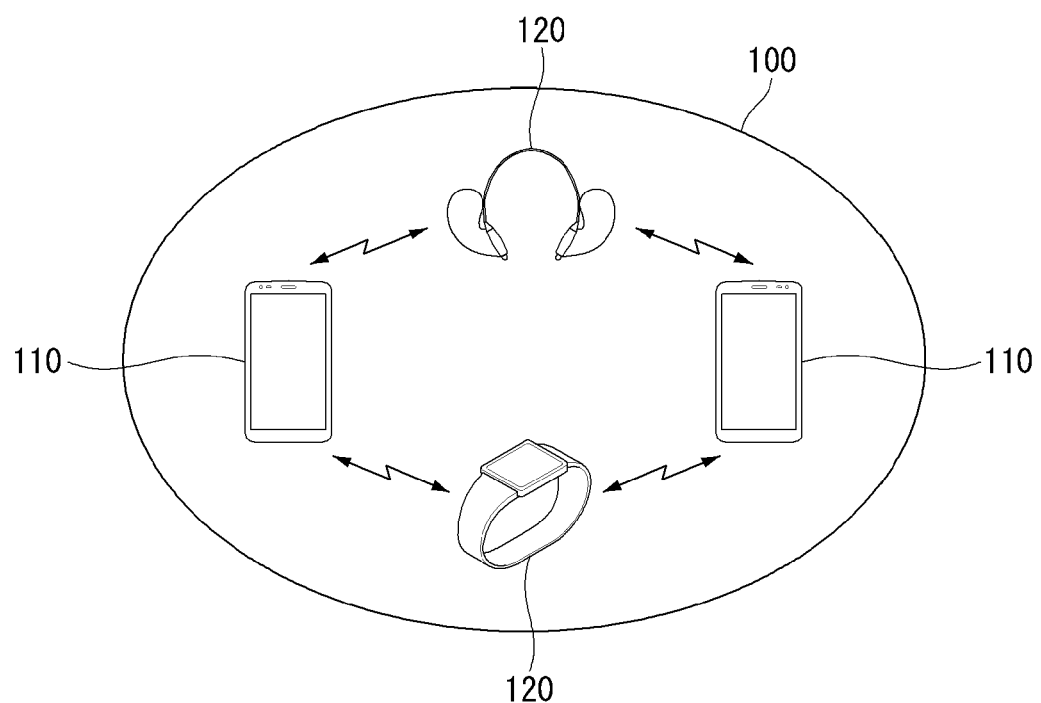
FIG. 1 is a schematic view illustrating an example of a wireless communication system using a Bluetooth low energy (BLE) technology proposed in this disclosure.

FIG. 1 is a schematic view illustrating an example of a wireless communication system using a Bluetooth low energy (BLE) technology proposed in this disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a positioning host device (PHD), a tag, a first device, and the like, and the client device 110 may be expressed as a master device, a master, a client, a member, a sensor device, a sink device, a collector, a positioning client device (PCD), a location estimating device, a controller, a locator controller, a locator, a second device, and a third device, and the like.

The server device 120 and the client device 110 may correspond to a major component of the wireless communication system, and the wireless communication system may include a component other than the service device and the client device.

The server device 120 refers to a device which is provided with data from the client device 110 and performs direct communication with the client device 110, whereby when a data request is received from the client device 110, the server device 120 provides data to the client device 110 in response.

Also, in order to provide data information to the client device 110, the server device 120 transmits a notification message or an indication message. Also, when the service device transmits the indication message to the client device 110, the server device 120 receives a confirmation message corresponding to the indication message from the client device 110.

Also, the server device 120 may provide data information to a user through an output unit (display unit) or receive a request input from the user through an input unit (user input interface) in a process of transmitting and receiving notification, indication, and confirmation messages to and from the client device 110.

Also, the server device 120 may read data from a memory unit or write new data into the corresponding memory in a process of transmitting and receiving a message to and from the client device 110.

Also, one server device 120 may be connected to a plurality of client devices, and may be easily re-connected (or connected) with client devices by utilizing bonding information.

The client device 110 refers to a device requesting data information and data transmission from the server device.

The client device 110 receives data through a notification message, an indication message, and the like, from the server device 120, and when the indication message is received from the server device 120, the client device 110 transmits an acknowledgement message as a response to the indication message.

Similarly, the client device 110 may provide information to a user through an output unit or receive a user input through an input unit in a process of transmitting and receiving messages to and from the server device 120.

Also, the client device 110 may read data from the memory or write new data into the corresponding message in a process of transmitting and receiving a message to and from the server device 120.

Also, the client device 110 (hereinafter, referred to as a "positioning client device (PCD)") may receive location information and transmission signal strength from the server device 120 (hereinafter, referred to as a "positioning host device (PHD)"), measures strength of the received signal to measure a distance to the PHD 120, and measure distances to at least three devices to estimate or measure a location of the PHD 120.

However, as for the method of measuring strength of the received signal, since a received signal may reach through lots of reflections, and the like, even though strength of the received signal is accurately measured, a distance inferred therethrough has low accuracy. This problem may be solved by enhancing accuracy by calculating an angle between the PCD 110 and the PHD 120 using multiple antennas.

Also, such a positioning method has a problem in that a location of the PHD 120 cannot be measured through a third device (hereinafter, referred to as a "controller") and the controller cannot control the PCD 110 to measure a location of the PHD 120.

Thus, in order to solve such a problem, the present invention proposes a method for measuring a location of the PCD by controlling the PHD through the controller.

Figure 2:
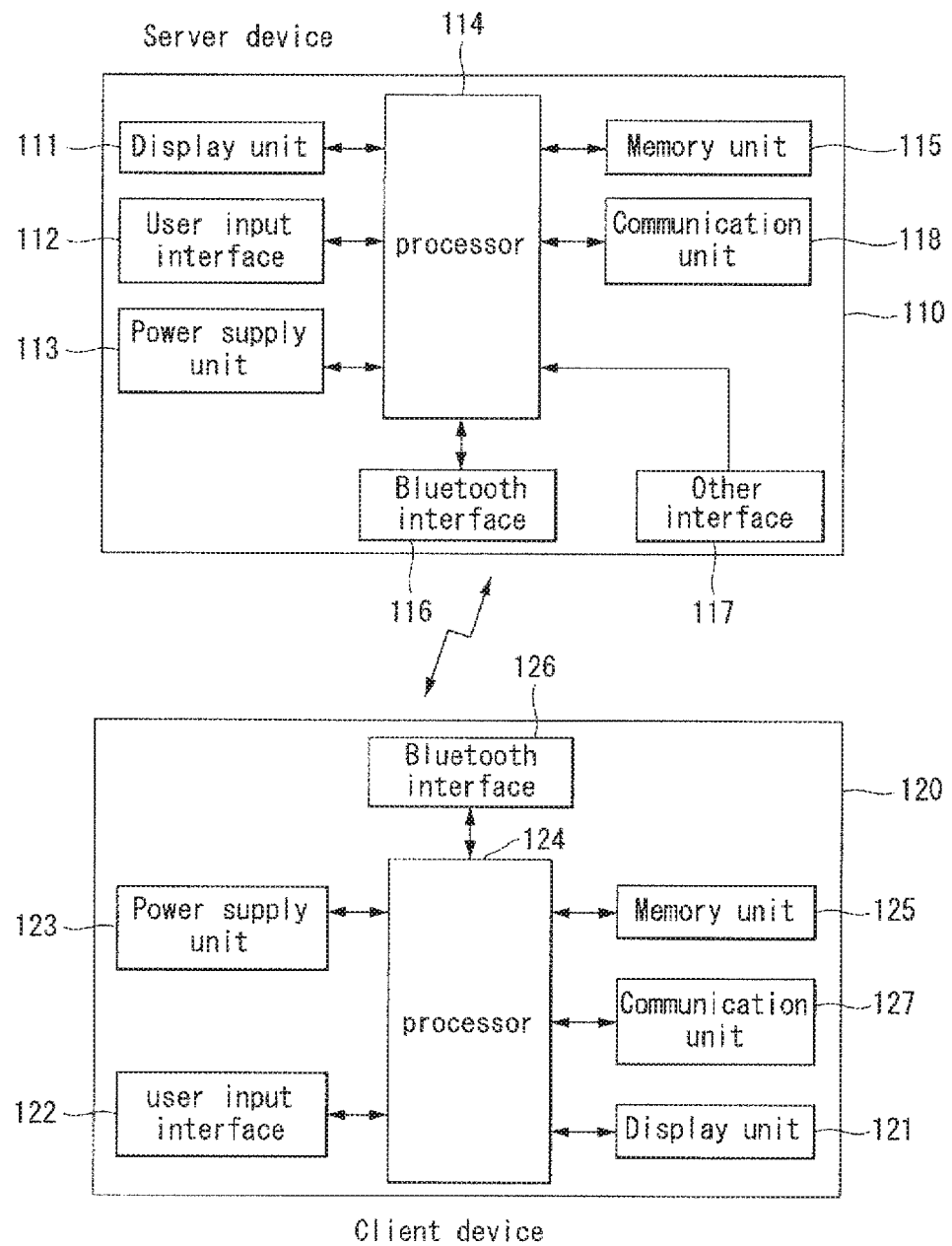
FIG. 2 is a view illustrating an example of an internal block diagram of a device capable of implementing methods proposed in this disclosure.

FIG. 2 is a view illustrating an example of an internal block diagram of a device capable of implementing methods proposed in this disclosure.

As illustrated in FIG. 2, a PHD 200 includes an output unit (or a display unit) 210, an input unit (or a user input interface) 220, a power supply unit 230, a processor 240, a memory unit 250, a Bluetooth interface 270, another communication interface (or other interface) 280, and a communication unit (or a transceiver unit) 260.

The output unit 210, the input unit 220, the power supply unit 230, a processor 240, the memory 250, the Bluetooth interface 270, other interface 280, and the communication unit 260 are functionally connected to perform a method proposed in this disclosure.

Also, the PCD 300 includes an output unit (or a display unit) 310, an input unit (or a user input interface) 320, a power supply unit 330, a processor 340, a memory unit 350, a Bluetooth interface 370, and a communication unit (or a transceiver unit) 360.

The output unit 310, the input unit 320, the power supply unit 330, the processor 340, the memory unit 350, the Bluetooth interface 370, and the communication unit 360 are functionally connected to perform a method proposed in this disclosure.

The controller discussed with reference to FIG. 1 may have the same component as that of the PHD.

The Bluetooth interfaces 270 and 370 refer to units (or modules) capable of transmitting a request/response, a command, a notification, an indication/acknowledgement message, and the like, between devices, or data, using a Bluetooth technique.

The memory units 250 and 350 refer to units storing various types of data, as units implemented in various types of devices.

The processors 240 and 340 refer to modules controlling a general operation of a server device or a client device, and control to request transmission of a message by a Bluetooth interface and other communication interface and process a received message.

The processors 240 and 340 may be expressed as controllers, control units, and the like.

The processors 240 and 340 may include an application-specific integrated circuit (ASIC), other chip set, a logic circuit and/or data processing unit.

The processors 240 and 340 control the communication unit to receive an advertising message from the server device, control the communication unit to transmit a scan request message to the server device and receive a scan response message as a response with respect to the scan request from the server device, and control the communication unit to transmit a connection request message to the server device to establish Bluetooth connection with the server device.

Also, after establishing BLE connection through the connection procedure, the processors 240 and 340 controls the communication unit to read or write data using an attribute protocol from the server device.

The memory units 250 and 350 may include a read-only memory (ROM), a random access memory (RAM), a flash memory, a memory card, a storage medium and/or other storage device.

The communication units 260 and 360 may include a baseband circuit for processing a wireless signal. When an embodiment is implemented by software, the aforementioned technique may be implemented by a module (process, function, etc.) performing the aforementioned function. The module may be stored in a memory and executed by a processor.

The memory units 250 and 350 may be present within or outside the processors 240 and 340 and may be connected to the processors 240 and 340 through various well-known units.

The output units 210 and 310 refer to modules providing state information of a device, message exchange information, and the like, to a user.

The power supply units 230 and 330 refer to modules supplying power required for operations of components upon receiving external power or internal power under the control of the controller.

As discussed above, in the BLE technique, a small duty cycle is provided and power consumption may be significantly reduced through a low data rate, whereby the power supply units may supply power required for operations of the components even with small output power (10 mW (10 dBm) or less).

The input units 220 and 320 refer to modules providing a user input to the controller, like a screen button, to allow a user to control an operation of a device.

Figure 3:
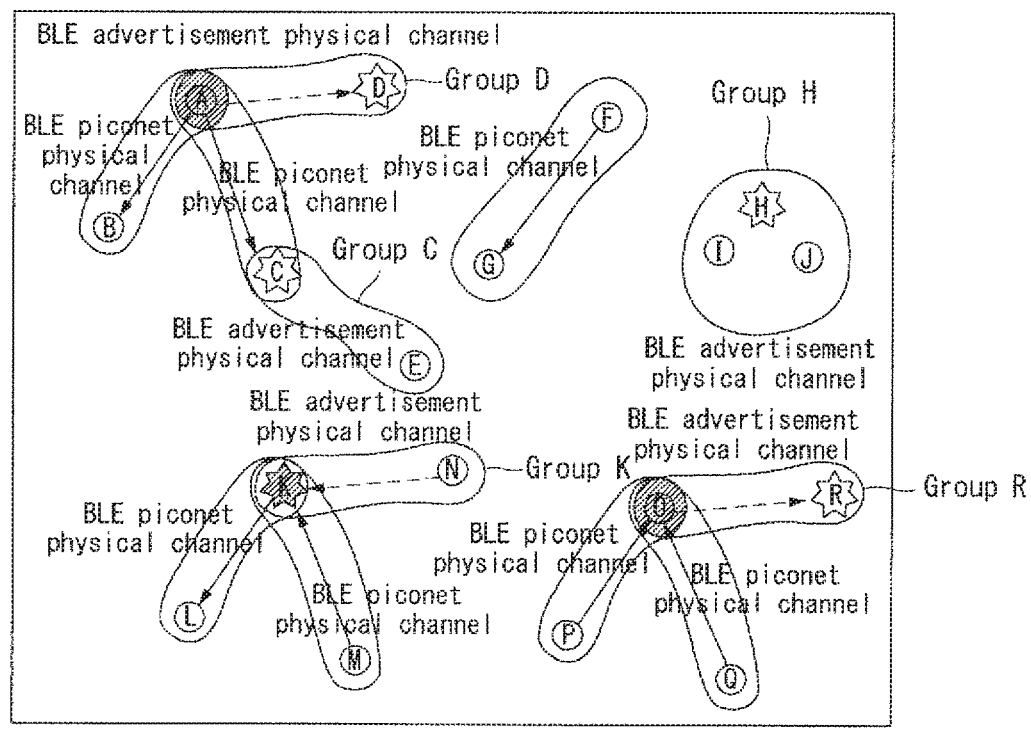
FIG. 3 is a view illustrating an example of BLE topology.

FIG. 3 is a view illustrating an example of BLE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 3, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
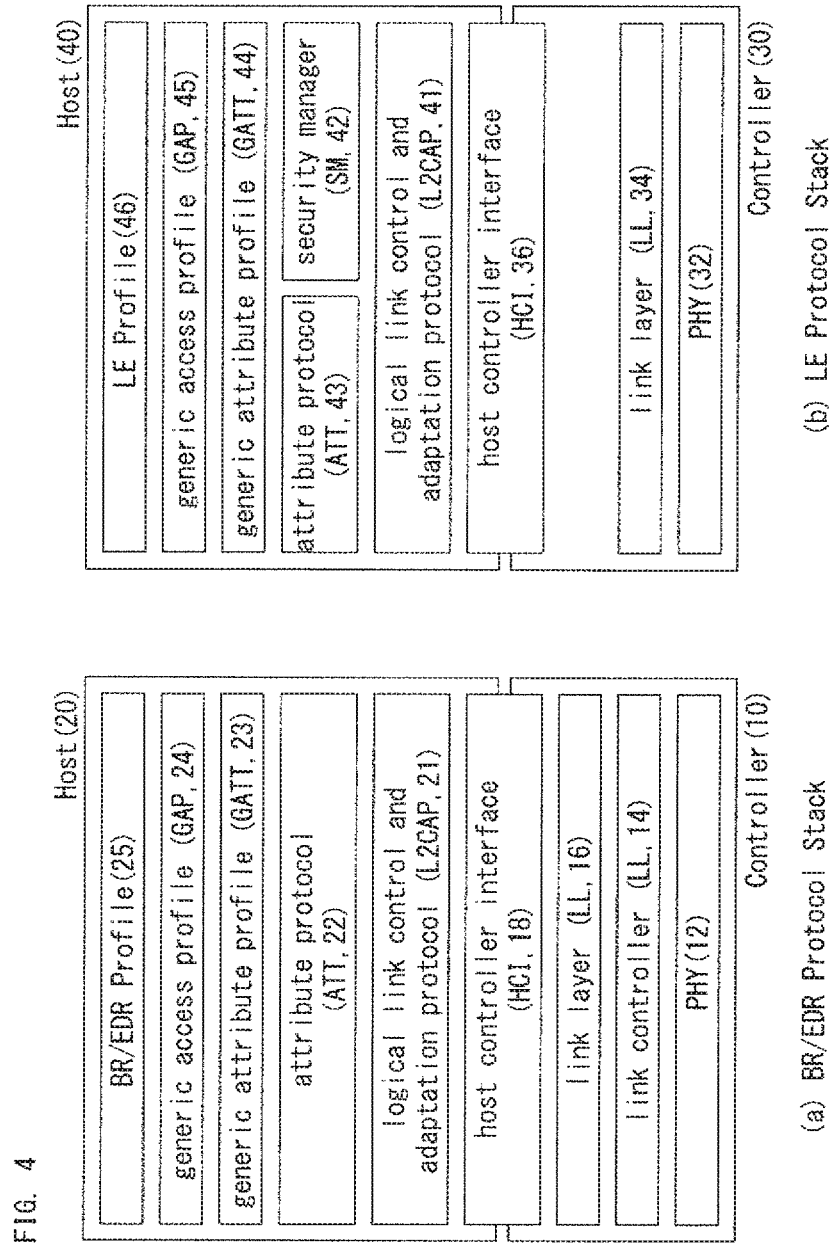
FIG. 4 is a view illustrating an example of Bluetooth communication architecture to which methods proposed in this disclosure is applicable.

FIG. 4 is a view illustrating an example of Bluetooth communication architecture to which methods proposed in this disclosure is applicable.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP, 21), a security manager (SM, 22), an attribute protocol (ATT, 23), a generic attribute profile (GATT, 24), a generic access profile (GAP, 25), and a BR/EDR profile (26).

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The security manager (SM, 22) is a protocol for authenticating a device and providing key distribution.

The generic attribute profile (GATT) 24 may operate as a protocol how the attribute protocol 23 is used in configuring services. For example, the generic attribute profile 24 may operate how ATT attributes are grouped together with services, and operate to describe features associated with services.

Thus, the GATT 24 and the ATT 23 may use features in order to describe status and services of a device and describe how the features are related and used.

The attribute protocol (ATT, 23) and profile (26) define a service (profile) using Bluetooth BR/EDR and define an application protocol for exchanging data thereof, and the generic access profile (GAP, 25) defines a scheme for discovering and connecting a device and providing information to a user, and provides privacy.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP (41) may operate to multiplex data between higher layer protocols, segment and reassemble packages, and manage transmission of multicast data.

In BLE, three fixed channels (one for a signaling channel (CH), one for a security manager, and one for an attribute protocol).

Meanwhile, BR/EDR (Basic Rate/Enhanced Data Rate) uses a dynamic channel and supports protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile (46), profiles dependent upon GATT, is mainly applied to a BLE device. The LE profile (46) may include, for example, Battery, Time, FindMe, Proximity, Time, Object Delivery Service, and the like, and details of GATT-based Profiles are as follows.

① Battery: Battery information exchanging method

② Time: Time information exchanging method

③ FindMe: Provision of alarm service according to distance

④ Proximity: Battery information exchanging method

Time: Time Information Exchanging Method

The generic attribute profile (GATT) 44 may operate as a protocol describing how the attribute protocol (ATT) 43 is used when services are configured. For example, the GATT

44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, omnidirectional broadcast refers to broadcast in all (every) directions, rather than broadcast in a specific direction.

In contrast, directional broadcast refers to broadcast in a specific direction. Omnidirectional broadcast takes place between an advertising device and a device in a listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response including additional user data requested by the scanning device, as a response to the scan request, through an advertisement physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode Discovering Procedure Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier Scanning State The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device Initiating State The LL enters the initiating state according to an instruction from the host (stack).

When the LL is in the initiating state, the LL performs listening on advertising channel indices.

During the initiating state, the LL listens to an advertising channel index during the scan window interval Connection State When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state Scanning PDU The following advertising channel DPU types are termed scanning PDUs and are used in a state described hereinafter.

SCAN_REQ: Transmitted by the LL in a scanning state and received by the LL in an advertising state.SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
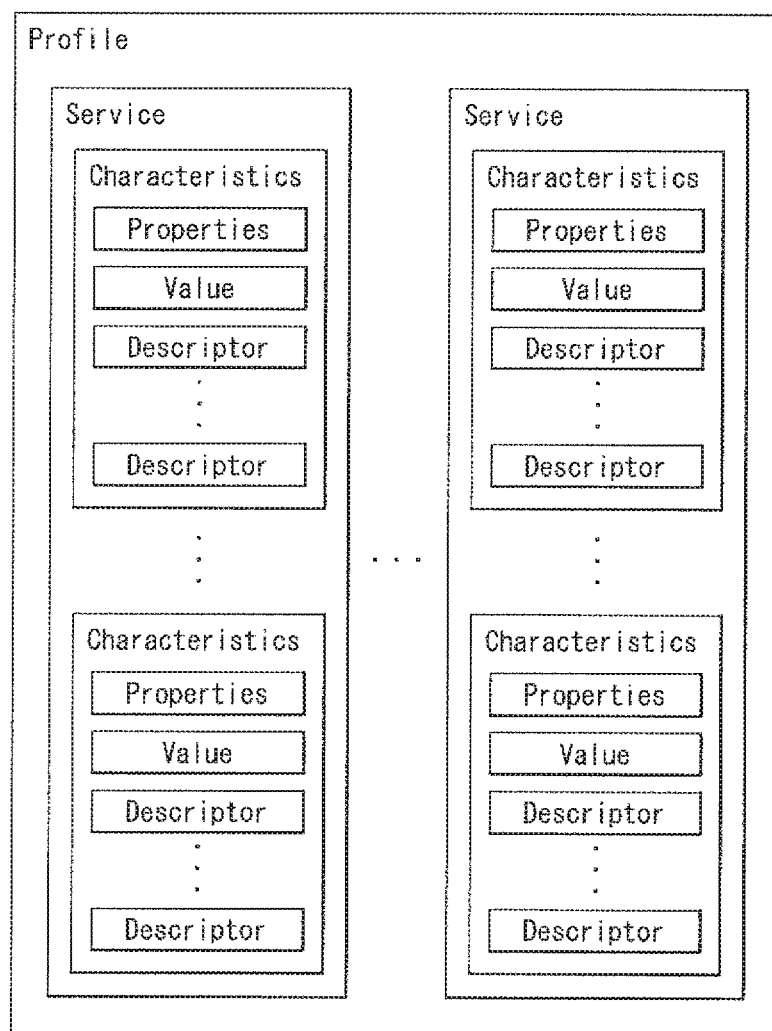
FIG. 5 is a view illustrating an example of a structure of generic attribute profile (GATT) of BLE.

FIG. 5 is a view illustrating an example of a structure of generic attribute profile (GATT) of BLE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method in which a sensor measures and stores human activities by using a GATT-based operational structure of the Bluetooth LE, and a client retrieves the stored information from the sensor.

Figure 6:
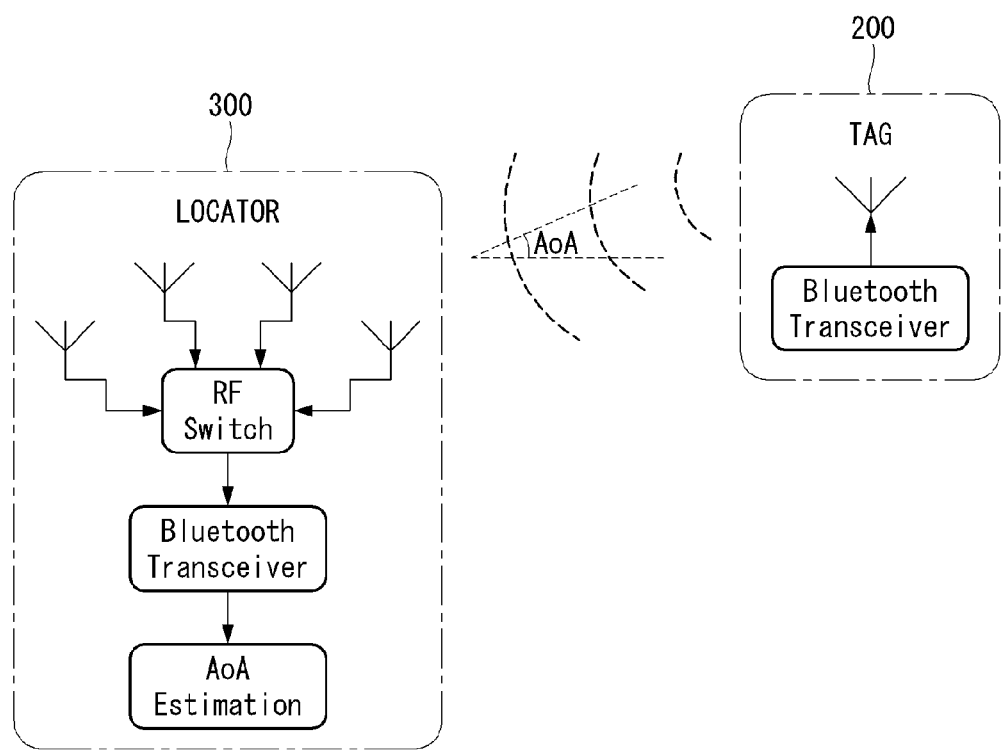
FIG. 6 is a view illustrating an example of estimating a location using a Bluetooth low energy (BLE) technique proposed in this disclosure.

FIG. 6 is a view illustrating an example of estimating a location using a Bluetooth low energy (BLE) technique proposed in this disclosure.

Referring to FIG. 6, the PCD 300 may measure a location of the PHD 200 by calculating an angle with the PHD 200 through a signal received from the PHD 200 using a multi-antenna technique.

In detail, the PCD 300 has multiple antennas, and the PHD 200 has a single antenna. The PHD 200 may broadcast or unicast a signal for estimating a location thereof, and the PCD 300 may receive the signal transmitted from the PHD 200 through each antenna.

Through signals received by each antenna of the PCD 300, the PCD 300 may estimate or measure a location of the PHD 200 by measuring strength of a signal received from the PHD 200 and the calculated angle.

Hereinafter, a location estimating or measuring method will be described.

Figure 7:
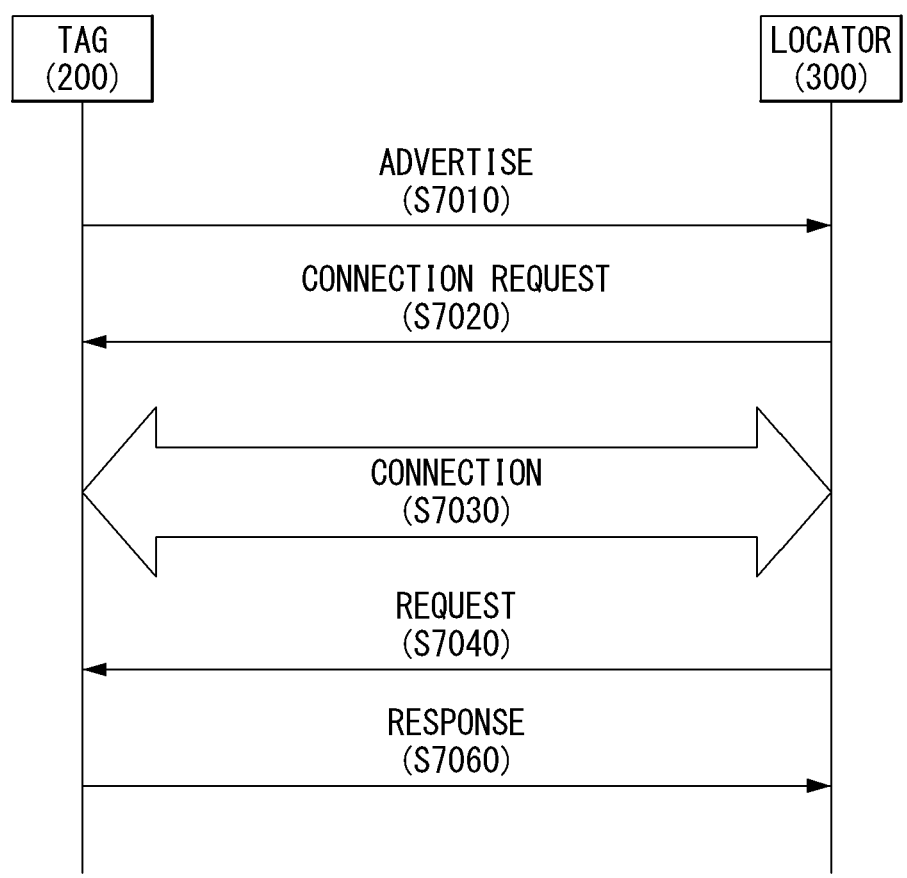
FIG. 7 is a flow chart illustrating an example of estimating a location using a BLE technique proposed in this disclosure.

FIG. 7 is a flow chart illustrating an example of estimating a location using a BLE technique proposed in this disclosure.

Referring to FIG. 7, when the PHD 200 and the PCD 300 are connected through Bluetooth, the PCD 300 may request information for estimation or measurement of a location of the PHD 200 to estimate or measure a location of the PHD 200.

In detail, for BLE connection between the PHD 200 and the PCD 300, the PHD 200 transmits an advertising message to the PCD 300 (S7010).

The advertising message may be used to provide own information to another device by utilizing BLE, and may include various types of information such as service information, user information, and the like, provided by a device.

The PCD checks information included in the advertising message transmitted from the PHD 200, transmits a connection request message for requesting BLE connection from the PHD 200 (S7020), and establishes a BLE connection with the PHD 200 (S7030). With the BLE connection established, the PHD 200 and the PCD 300 share a channel for exchanging data with each other.

Thereafter, the PCD 300 transmits a request message (e.g., LL_AoA_REQ) for requesting a packet including location information for estimating or measuring a location of the PHD 200 to the PHD 200 (S7040), and in response thereto, the PHD 200 includes a packet including the location information in a response message (e.g., LL_AoA_RSP) and transmits the same to the PCD 300 (S7050).

The PCD 300 calculates an angle using the location information transmitted from the PHD 200 and/or the response message received through multiple antennas, and estimate or measure a location of the PHD 200 according to the method described above with reference to FIG. 6.

However, such a method may be used only in the PHD 200 and the PCD 300, and there is no method for controlling the PHD 200 or the PCD 300 through a third device, rather than the PHD 200 or the PCD 300, or obtaining information of the PHD 200 or the PCD 300.

Thus, in order to solve the problem, the present invention proposes a method for a third device to control the PCD 300 to estimate or measure a location of the PHD 200 and obtain information of the PHD 200 or the PCD 300.

Figure 8:
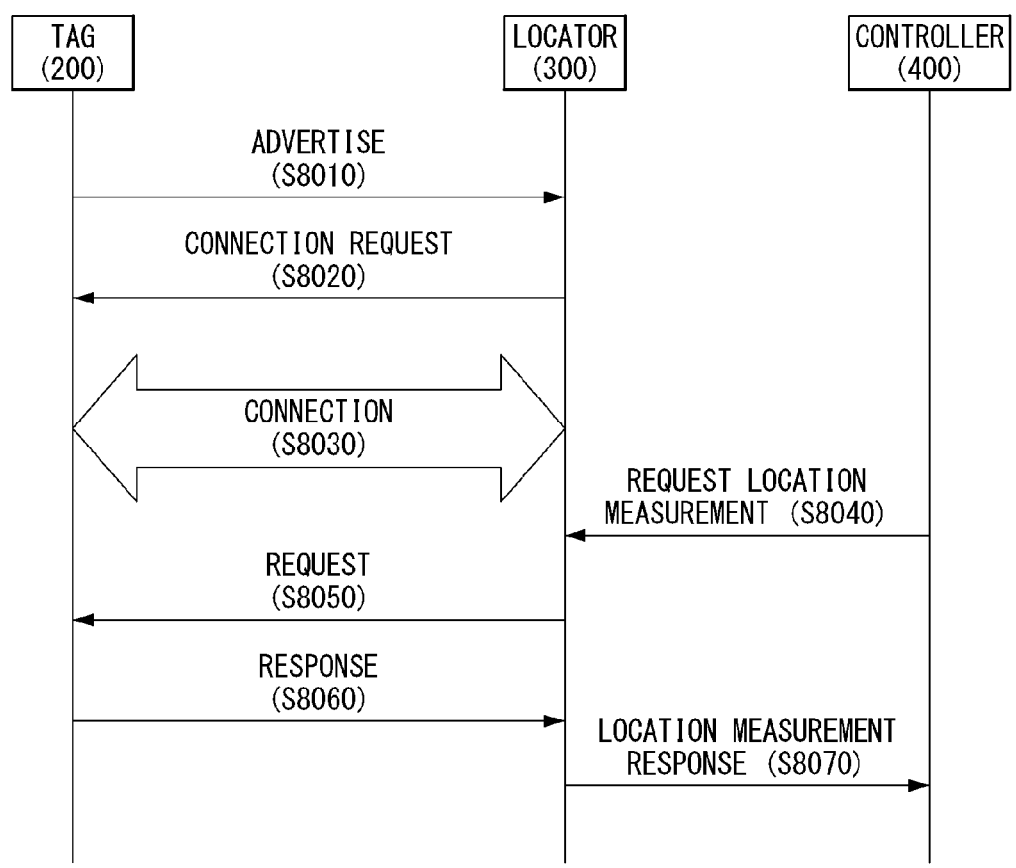
FIG. 8 is a flow chart illustrating an example in which a third device estimates a location using a BLE technique proposed in this disclosure.

FIG. 8 is a flow chart illustrating an example in which a third device estimates a location using a BLE technique proposed in this disclosure.

First, step S8010 to S8030 are the same as steps S7010 to S7030 of FIG. 7, and thus, descriptions thereof will be omitted.

In order to search for the PHD 200 or a device to which the PHD 200 is attached in a case in which the PHD 200 is in the form of a tag, the controller 400 may transmit a location information request message requesting estimation or measurement of a location of the PHD 200 to the PCD 300 (S8040).

Also, through the location information request message, the PCD 300 may set an interval for estimating or measuring a location of the PHD 200 or request a change in a list of devices whose location may be estimated or measured.

Thereafter, the PCD 300 transmits a request message (e.g., LL_AoA_REQ) for requesting a packet including location information for estimating or measuring a location of the PHD 200 to the PHD 200 (S8050). Here, when the controller transmits an interval for estimating or measuring a location of the PHD 200 in the location information request message together, the PCD 300 transmits the request message according to the transmitted interval.

The PHD 200 includes a packet including the location information in a response message (e.g., LL_AoA_RSP) as a response with respect to the request message, and transmits the response message to the PCD 300 (S8060).

The PCD 300 calculates an angle using the location information transmitted from the PHD 200 and/or the response message received through the multiple antennas to estimate or measure a location of the PHD 200 according to the method described above with reference to FIG. 6, includes the estimated or measured location value or location information of the PHD 200 in a location information response message, and transmits the same to the controller.

Through this method, the controller 400, the third device, may check a location of the PHD 200.

Figure 9:
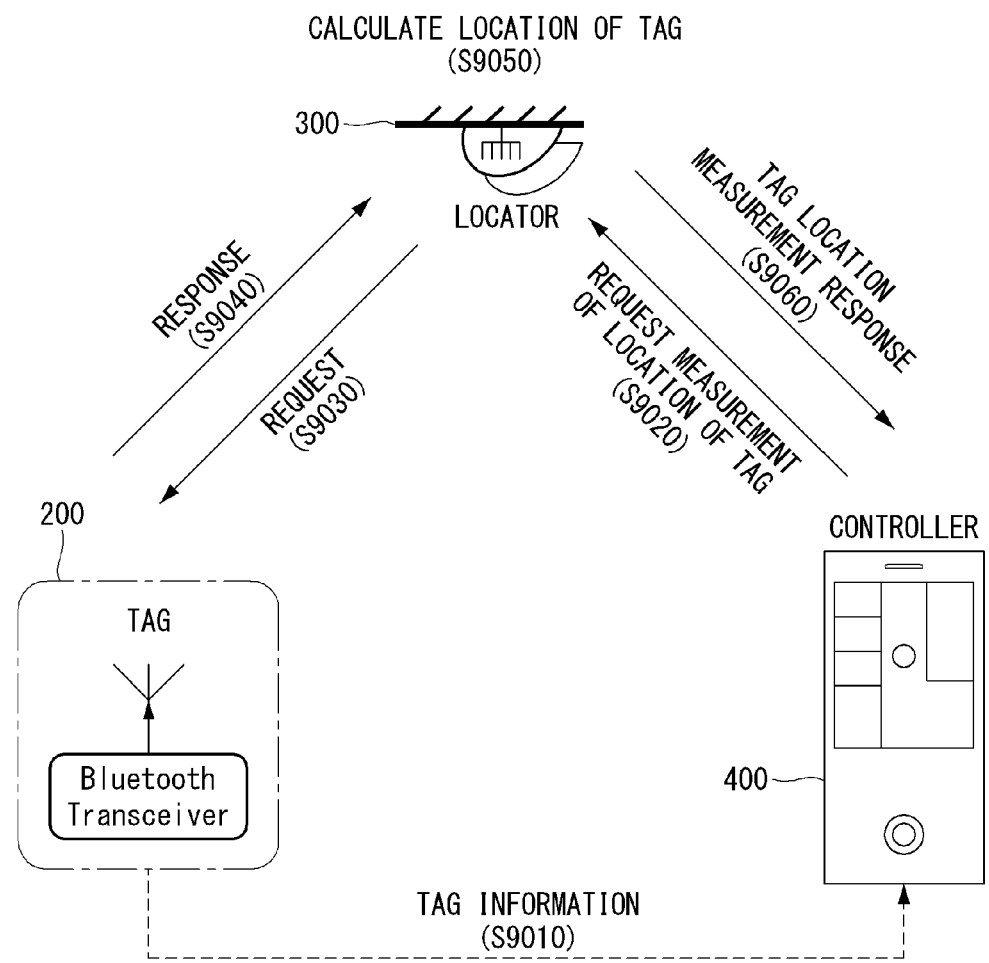
FIG. 9 is a view illustrating an example of a flow of a message between devices whose location is to be estimated by a third device using a using a BLE technique proposed in this disclosure.

FIG. 9 is a view illustrating an example of a flow of a message between devices whose location is to be estimated by a third device using a using a BLE technique proposed in this disclosure.

Referring to FIG. 9, a message flow of the method described above with reference to FIG. 8 may be described. First, the controller 400 obtains information of the PHD 200 such as a device whose location is to be estimated or measured, that is, information of the PHD 200 such as an address, a name, interface information, service information and/or device type information, and the like, of the PHD 200 (S9010).

In order to search for the PHD 200 or a device to which the PHD 200 is attached in a case in which the PHD 200 is in the form of a tag, the controller 400 may transmit a location information request message requesting estimation or measurement of a location of the PHD 200 to the PCD (S9020).

Here, the request message may be transmitted in a broadcast manner or a unicast manner.

Thereafter, the PCD 300 may transmit a request message requesting a packet including location information for estimating or measuring a location of the PHD 200 to the PHD 200 (S9030), and here, a PDU type of the request message may be LL_AoA_REQ.

In response to the request message, the PHD 200 may include a packet including the location information in a response message and transmit the same to the PCD 300 (S9040), and here, a PDU type of the response message may be LL_AoA_RSP.

The PCD 300 calculates an angle using the location information transmitted from the PHD 200 and/or the response message received through multiple antennas to estimate or measure a location of the PHD 200 according to the method described above with reference to FIG. 6 (S9050), and includes the estimated or measured location value or location information of the PHD 200 in a location information response message, and transmits the same to the controller (S9060).

Figure 10:
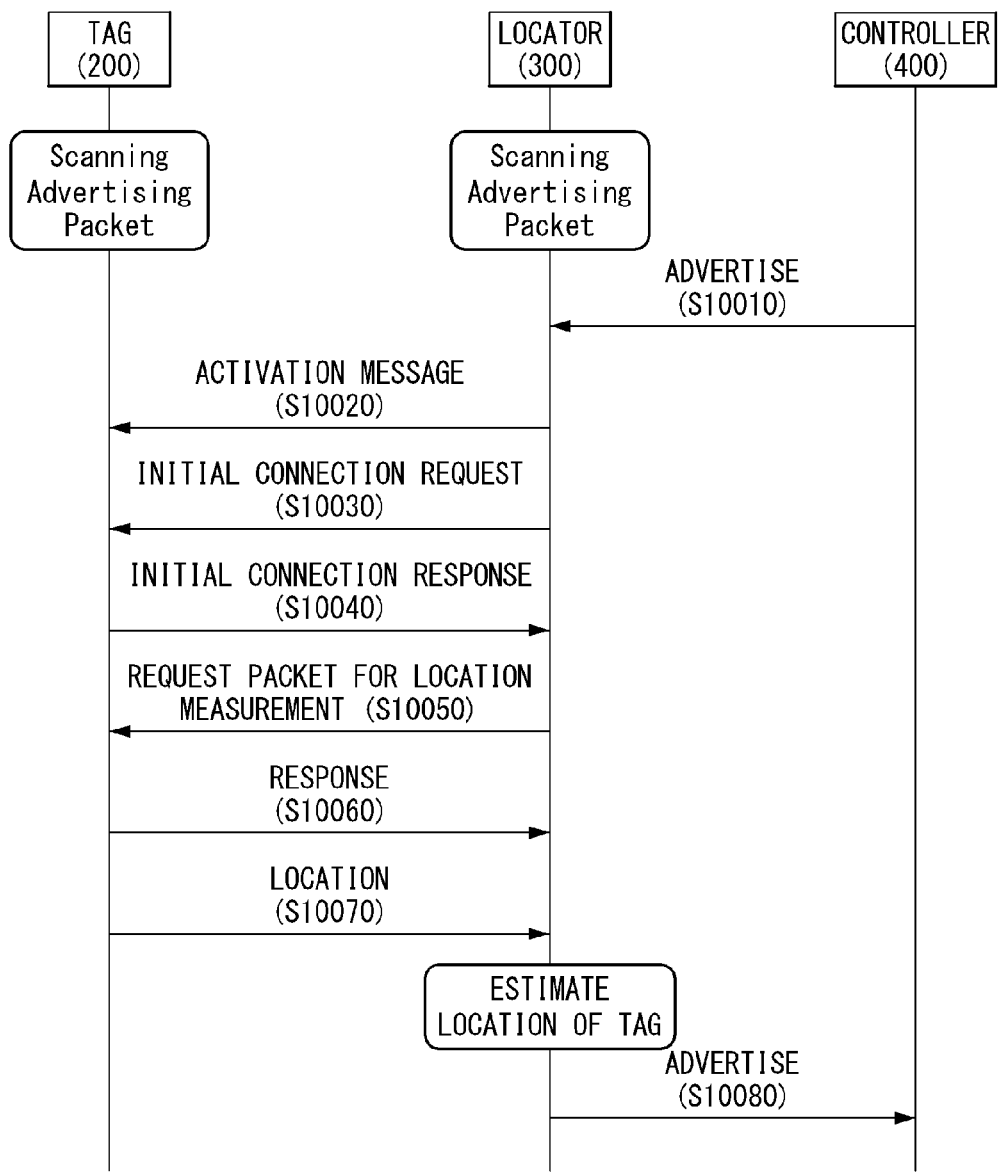
FIGS. 10 and 11 are views illustrating an example of a method for a third device to estimate a location using a using a BLE technique proposed in this disclosure, and a data format.
Figure 11:
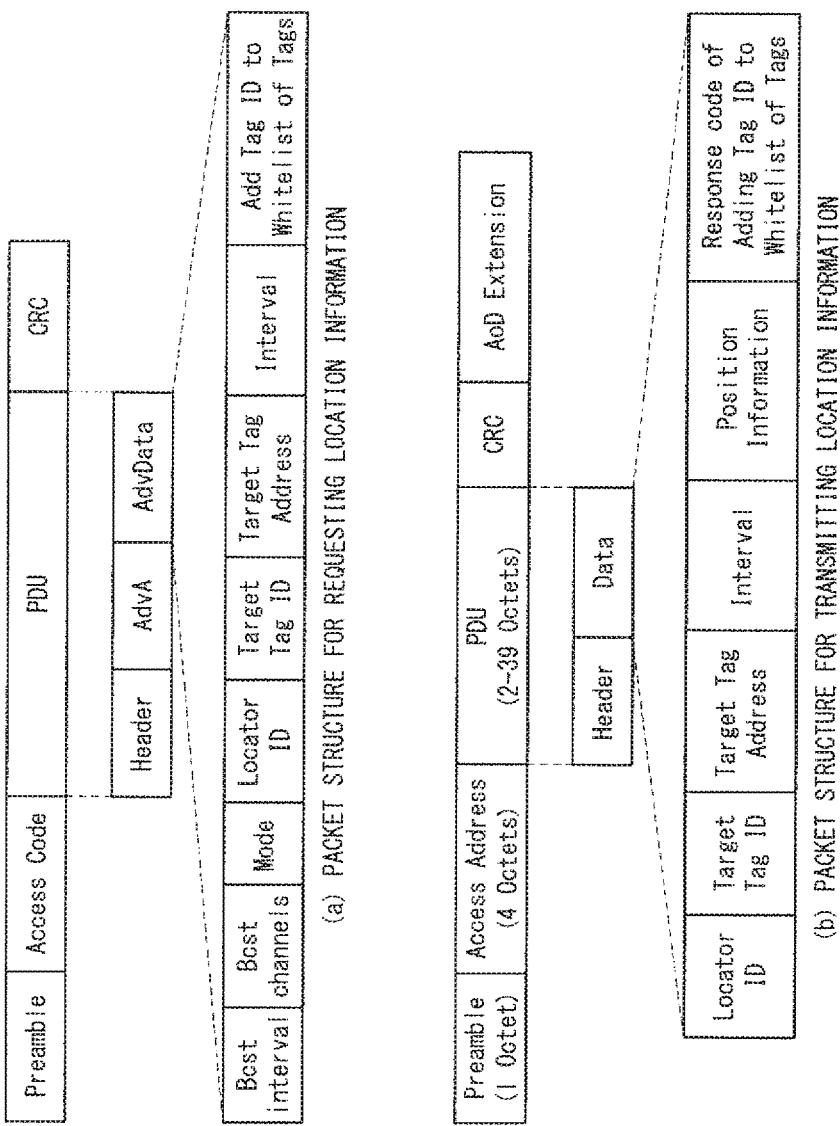

FIGS. 10 and 11 are views illustrating an example of a method for a third device to estimate a location using a using a BLE technique proposed in this disclosure, and a data format.

Referring to FIGS. 10 and 11, the controller 400 may request estimation or measurement of a location of the PHD 200 from the PCD 300 in a broadcast manner.

In detail, the controller 400 broadcasts an advertising message for requesting estimation or measurement of a location of the PHD 200 to the PCD 300 (S10010). Here, the advertising message may have such a structure as (a) of FIG. 11, and may have a PDU type such as ADV_PRA_AoA_Find_Tag_IND.

The advertising message may include a preamble field, an access code field, a PDU field, and a CRC field. The preamble field may consist of 1 octet, the access code field may consist of four octets, the PDU field may consist of 2 octets to up to 39 octets, and the CRC field may consist of 3 octets.

Such octet structures are merely illustrative and not limited thereto.

The preamble field indicates a signal used for adjusting synchronization of two systems in data communication, and the access code field may indicate an access address.

The packet data unit (PDU) field refers to a portion including data. The PDU field may be divided into a header and payload (not shown), and the CRC field is a field for detecting an error when the data packet is transmitted.

The payload may include an AdvA field representing an address of the controller 400 and an AdvData field representing transmission data.

The AdvData field may include a Bcst interval field, a Bcst channel field, a Mode field, a locator ID field, a target PHD ID field, a target PHD address field, an interval field, and an Add PHD ID to whitelist of PCD field.

The Bcst interval field may represent information regarding when a message including data is to be transmitted after the advertising message, and the Bcst channel field may represent in which frequency hopping pattern the data packet is to be transferred.

The Mode field may represent whether a data message is to be transmitted from the controller 400 in a broadcast manner or unicast manner after the advertising message is transmitted.

The locator ID field may include information for identifying the PCD 300, and the target PHD ID field includes information for identifying the PHD 200 for estimating or measuring a location.

The target PHD address field represents an address of the PHD 200 for estimating or measuring a location.

After receiving the advertising message, the PCD may know a device whose location is to be estimated or measured through information included in the target PHD ID field of the advertising message, and transmits an activation message requesting activation of the PHD 200 to the PHD 200 corresponding to the device (S10020). Here, the activation message may be transmitted in a broadcast manner.

Upon receiving the activation message, the PHD 200 is activated or activates a location tracking function such that the PCD 300 may estimate or measure a location of the PHD 200.

Thereafter, the PCD 300 transmits an initial connection request message to the PHD 200 to perform BLE connection with the PHD 200 (S10030), and the PHD 200 transmits an initial connection response message to the PCD 300 in response (S10040).

Establishing the Bluetooth connection through the initial connection request message and the initial connection response message, the PCD 300 may transmit a request message (or a first request message) requesting a packet including location information of the PHD 200 to the PHD 200 to estimate or measure a location of the PHD 200 (S10050), and a PDU type of the request message may be LL_AoA_REQ.

In response to the request message, the PHD 200 may transmit a response message (or a first response message) to the PCD 300 (S10060), and here, a PDU type of the response message may be an LL_AoA RSP.

The response message includes information such as an interval at which a packet including the location information is transmitted, a channel, and the like.

The PDC 300 may receive the packet including the location information transmitted from the PHD 200 on the basis of information included in the response message (S10070), and may calculate an angle using the received location information and/or the packet or message received through the multiple antennas to estimate or measure a location of the PHD 200 according to the method described above with reference to FIG. 6.

Here, the packet may be transmitted in a broadcast manner or a unicast manner.

Thereafter, the PCD 300 includes the estimated or measured location value or location information of the PHD 200 in an advertisement message, and transmits the same to the controller (S10080). Here, the advertising message may have a structure such as (b) of FIG. 11 and may have a PDU type such as ADV_PRA_AoA_Find_Tag_RSP.

The advertising message may include a preamble field, an access code field, a PDU field, a CRC field, and an AoD extension field.

The AoD extension field is a field for calculating an angle of departure (AoD) to estimate a location, and a promised long bit sequence may be transmitted through the AoD extension field, and the PCD 300 may receive it and calculate an angle with an antenna array of the PHD 200.

The PDU field may include a header field and a data field. The data field may include a locator ID field, a target PHD ID field, a target PHD address field, an interval field, a location information field and/or response code field.

The location information field may include information related to a location of the PHD 200 estimated or measured by the PCD 300, and may include parameters such as Table 2.

TABLE 2

| Parameter | Octets |
| --- | --- |
| Coordinates(East) | 2 or 4 octets |
| Coordinates(North) | 2 or 4 octets |
| Tx Power | 1 octet |
| Floor Number | 1 octet |
| Altitude | 2 octet |

The Coordinates(East) may represent a latitude, and the Coordinates(North) may represent a longitude.

The response code field may include information indicating an ID of a PHD added to a whitelist of the PCD 300.

Figure 12:
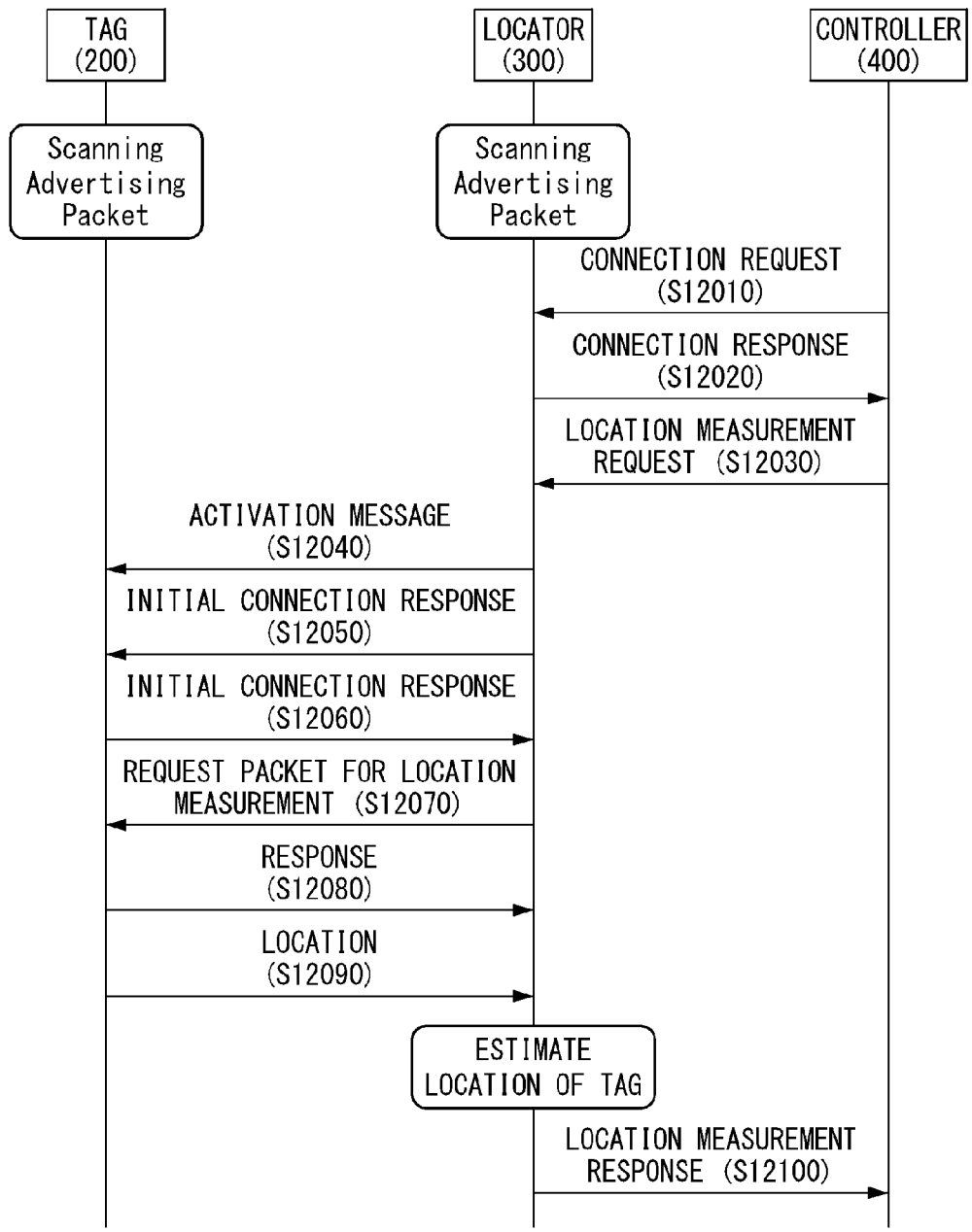
FIGS. 12 and 13 are views illustrating another example of a method for a third device to estimate a location using a using a BLE technique proposed in this disclosure, and a data format.
Figure 13:
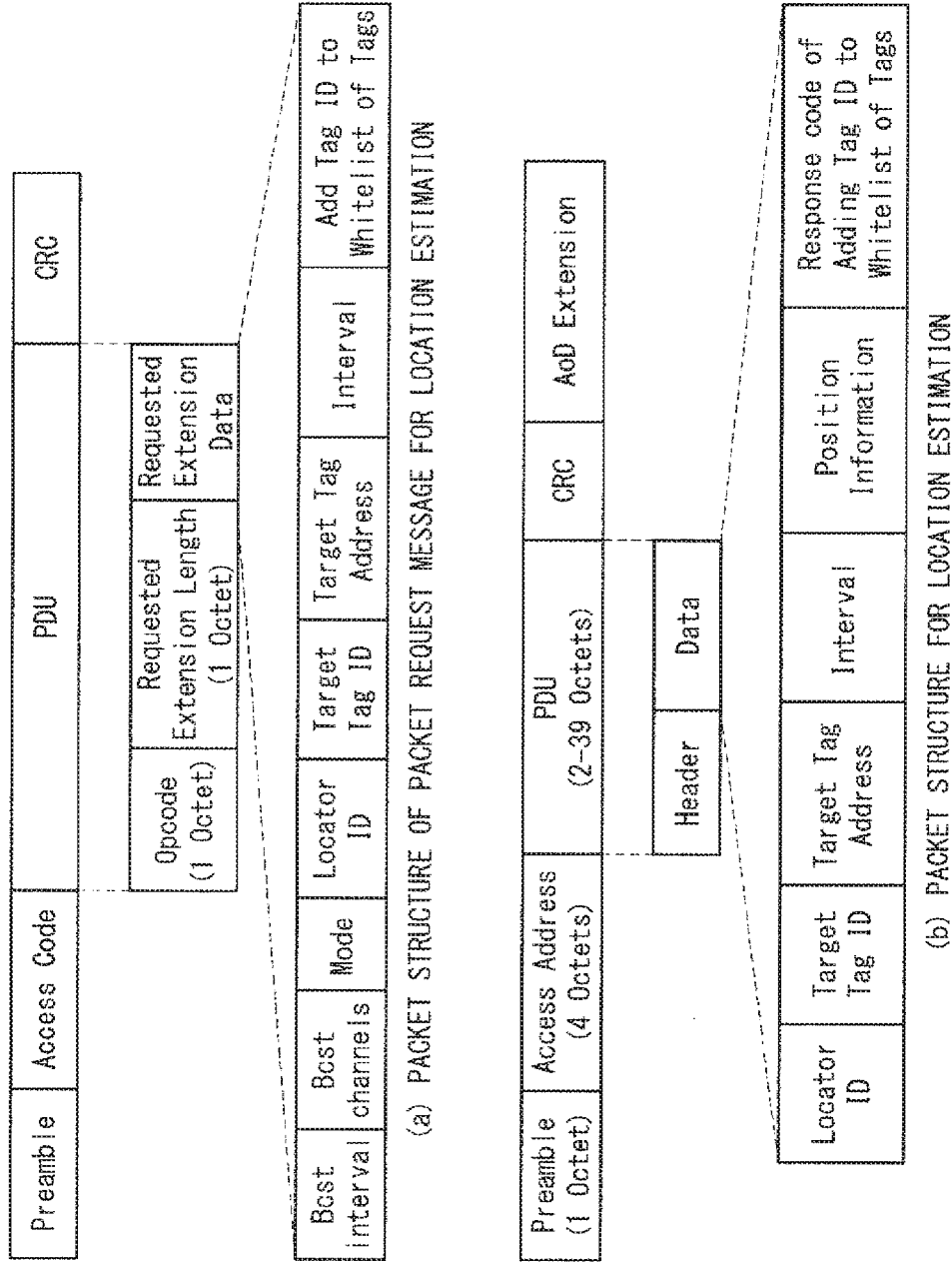

FIGS. 12 and 13 are views illustrating another example of a method for a third device to estimate a location using a using a BLE technique proposed in this disclosure, and a data format.

Referring to FIGS. 12 and 13, the controller 400 may request estimation or measurement of a location of the PHD 200 from the PCD 300.

In detail, for a Bluetooth connection with the PCD 300, the controller 400 may transmit a connection request message to the PCD 300 (S12010), and the PCD 300 may transmit a connection response message as a response with respect to the connection request message to the controller (S12020).

Upon receiving the connection response message, the controller 400 establishes a Bluetooth connection with the PCD 300, and through the Bluetooth connection, the controller 400 unicasts a location measurement request message requesting estimation or measurement of a location of the PHD 200 to the PCD 300 (S12030). Here, the location measurement request message may have such a structure as (a) of FIG. 13 and have the same PDU type as that of LL_AoA_Find_Tag_REQ.

Each field of (a) of FIG. 13 is the same as that of (a) of FIG. 11, and thus, descriptions thereof will be omitted.

Thereafter, step S12040 to S120990 are the same as steps S10020 to S10070 of FIG. 10, and thus, descriptions thereof will be omitted.

The PCD 300 includes location value information or location information of the estimated or measured PHD 200 in a location information response message and transmits the same to the controller (S12100). Here, the advertisement message may have the same structure as that of (b) of FIG. 13 and may have the same PDU type as that of LL_AoA_Find_Tag_RSP.

Each field of (B) of FIG. 13 is the same as that of (B) of FIG. 11, and thus, descriptions thereof will be omitted.

Figure 14:
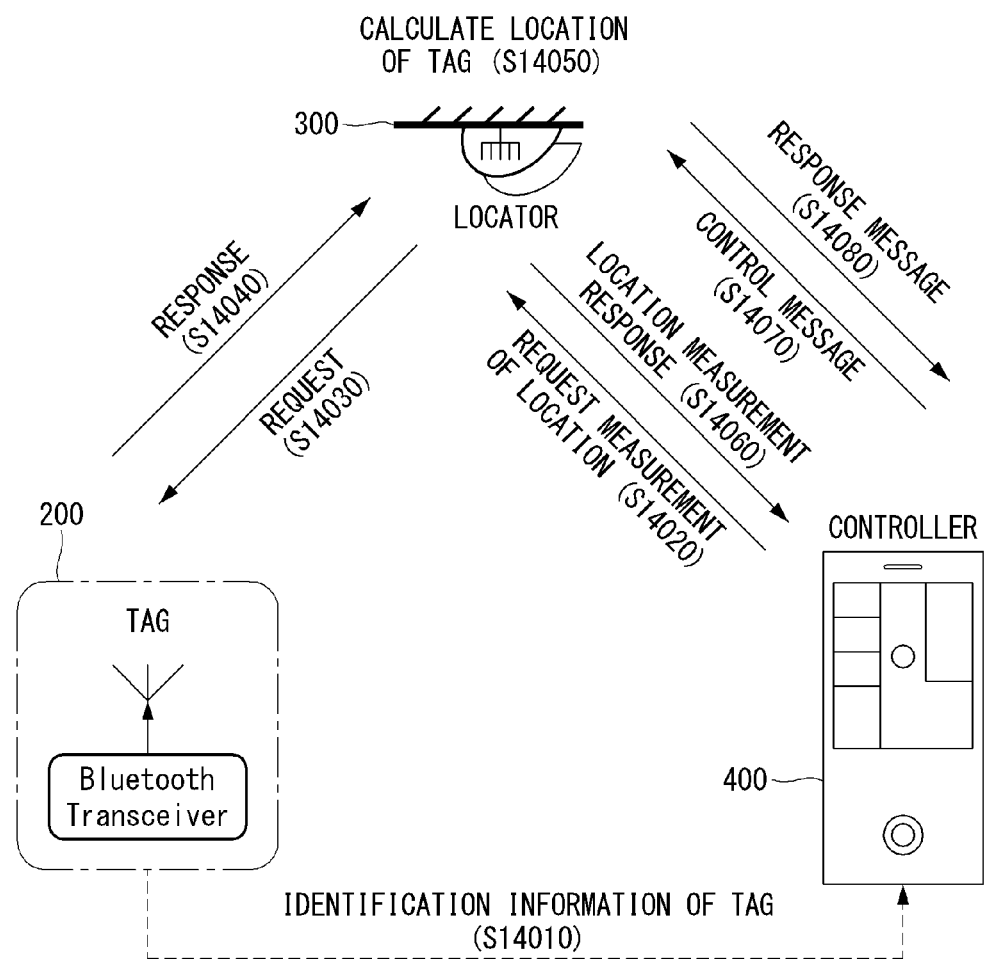
FIG. 14 is a view illustrating an example of a message flow of a method for a third device to control a positioning host device (PHD) and obtain information using a BLE technique proposed in this disclosure.

FIG. 14 is a view illustrating an example of a message flow of a method for a third device to control a positioning host device (PHD) and obtain information using a BLE technique proposed in this disclosure.

Referring to FIG. 14, the controller may transmit a control message to the PCD to control an operation of the PCD or the PHD and obtain information of the PCD or the PHD.

In detail, the controller 400 obtains information of a device whose location is to be estimated or measured, that is, information of the PHD 200 such as an address, a name, interface information, service information and/or device type information of the PHD 200 (S14010).

In order to measure or estimate a location of the PHD 200 or a device to which the PHD 200 is attached in a case in which the PHD 200 is in the form of a tag and in order to request information of the PCD, the controller 400 may transmit information request message to the PCD 300 (S14020).

Here, the request message may be transmitted in a broadcast or unicast manner, and a PDU type of the information request message may be AoA_Track_Device_REQ.

Thereafter, the PCD 300 transmits a request message requesting a packet including location information for estimating or measuring a location of the PHD 200 to the PHD 200 (S14030), and here, a PDU type of the request message may be LL_AoA_REQ.

As a response with respect to the request message, the PHD 200 may include a packet including the location information in a response message and transmit the same to the PCD 300 (S14040), and here, a PDU type of the response message may be LL_AoA_RS, and when the controller 400 requests information of the PHD, the requested information may be included.

The PCD 300 calculates an angle using the location information transmitted from the PHD 200 and/or the response message received through multiple antennas to estimate or measure a location of the PHD 200 according to the method described above with reference to FIG. 6 (S14050), includes the estimated or measured location value or location information of the PHD 200 in the location information response message and transmits the same to the controller (S14060). Here, when the controller 400 requests information of the PHD 200 or the PCD 300, the response message may include the requested information and a PDU type of the information response message may be AoA_Track_Device_RSP.

Thereafter, when the controller 400 wants to control the PCD 300, the controller 400 may transmit a control message to the PCD 300 (S14070). For example, in order to add a device to a list of devices whose location is to be estimated or measured by the PCD 300 or in order to request updating of the list, the controller may transmit the control message.

The PCD 300 may add a specific device to the list of the devices whose location is to be estimated or measured according to the control message, or may update the list, and transmit a response message to the controller (S14080). Here, a PDU type of the response message may be AoA_Track_Device_RSP.

Through this method, the controller may control the PHD or the PCD or obtain information of the PHD or the PCD.

Figure 15:
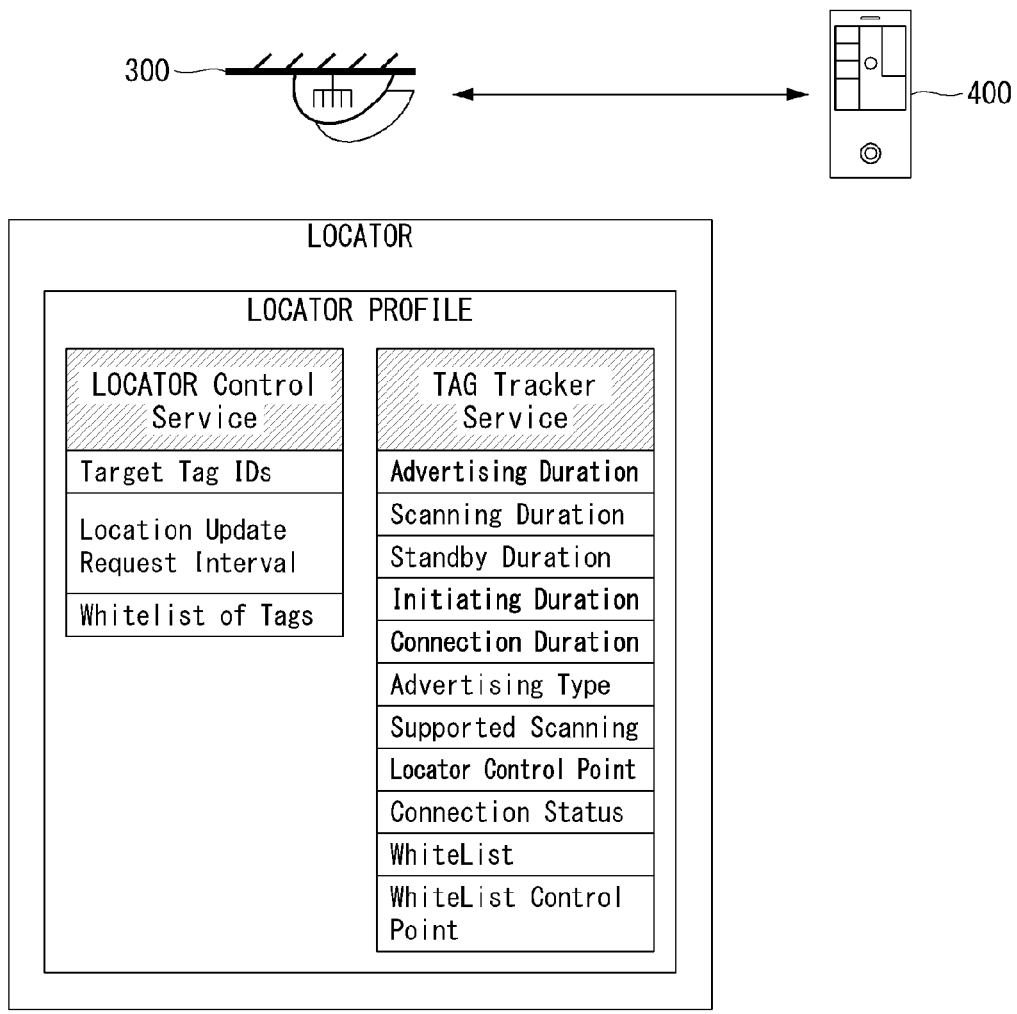

FIGS. 15 and 16 are views illustrating an example of a generic attribute profile (GATT) for a third device to control a PHD and obtain information using a BLE technique proposed in this disclosure.

A GATT structure of the PCD will be described with reference to FIG. 15. The GATT of the PCD includes a PCD control service as a service for controlling the PCD and characteristics for providing the service, and includes a PHD tracker service as a service for estimating or measuring a location of the PHD and characteristics for providing the service.

The characteristics will be described with reference to FIG. 16.

Through such GATT, the controller may obtain information of the PCD or control the PCD.

Referring to FIG. 16, characteristics for providing the service described above with reference to FIG. 15 are illustrated and descriptions of the characteristics are as follows.

Peer Device: It indicates an address value, a name, and the like, of a counter device to be paired, and may provide an address of a device to be paired through setting.

Device State: It refers to a link layer state of a controlled device, and may designate one or more states. It may request performing of a function of a corresponding state through write, and know a state of a controlled device through read, and know a change in a state of a controlled device through indication.

Scanning Duration: It indicates an operation time when a controlled device operates in a scanning state, and a corresponding value is meaningless in any other state.

Standby Duration: It indicates an operation time when a controlled device operates in a standby state, and a corresponding value is meaningless in any other state.

Initiating Duration: It indicates an operation time when a controlled device operates in an initiating state, and a corresponding value is meaningless in any other state.

Connection Duration: It indicates an operation time when a controlled device operates in a connection state, and a corresponding value is meaningless in any other state.

Advertising Type: It defines a specific advertising operation method, when an advertising operation is requested from a controlled device.

Locator Control Point: It is a control point function indicating which operation a controlled device is to execute.

connection State: Characteristics for a controlled device to provide connection information to a controller.

Whitelist: Information of devices to which a controlled device may be connected

Whitelist Control Point: A control function for managing whitelist managed by a controlled device Bondable: Whether to provide a bonding function by a controlled device is determined.

Security: Whether to provide authentication, authorization, Encryption, data signing function is determined Through the characteristics of the GATT, the controller 400 may obtain information of the PCD 300 or control the PCD 300 to perform a specific operation.

FIG. 17 is a view illustrating an example of a control point for a third device to control a PHD using a BLE technique proposed in this disclosure.

Referring to FIG. 17, the PCD may be controlled to perform a specific operation or not through a locator control point among characteristics discussed above with reference to FIG. 16.

In detail, the following operations may be controlled through a control point illustrated in FIG. 17.

execute: A device provides states defined in the device state described above with reference to FIG. 16 (it is able to provide a plurality of state functions).

Advertising Start: When an advertising operation is not performed, the corresponding operation is started.

(The corresponding function is immediately started and/or when a corresponding state is deactivated in a device state, it may be activated)

Advertising Stop: When an advertising operation is performed, the corresponding operation is terminated.

(The corresponding function is immediately stopped and/or when a corresponding state is activated in a device state, it may be deactivated)

Scanning Start: When a scanning operation is not performed, the corresponding operation is started.

(The corresponding function is immediately started and/or when a corresponding state is deactivated in a device state, it may be activated)

Scanning Stop: When an advertising operation is performed, the corresponding operation is terminated.

(The corresponding function is immediately stopped and/or when a corresponding state is activated in a device state, it may be deactivated)

Connecting Request: It establishes connection with a peer device

Connection Stop: It terminates connection with a peer device

Refresh Bonding: It newly updates bonding information (or it may delete bonding information)

Refresh Security: A security (authentication, authorization, encryption) between two devices is re-performed and information (key value of each security procedure) is updated.

Update Interval: It is a location information updating period of devices included in whitelist, a list of accessible devices managed by the locator.

Figure 18:
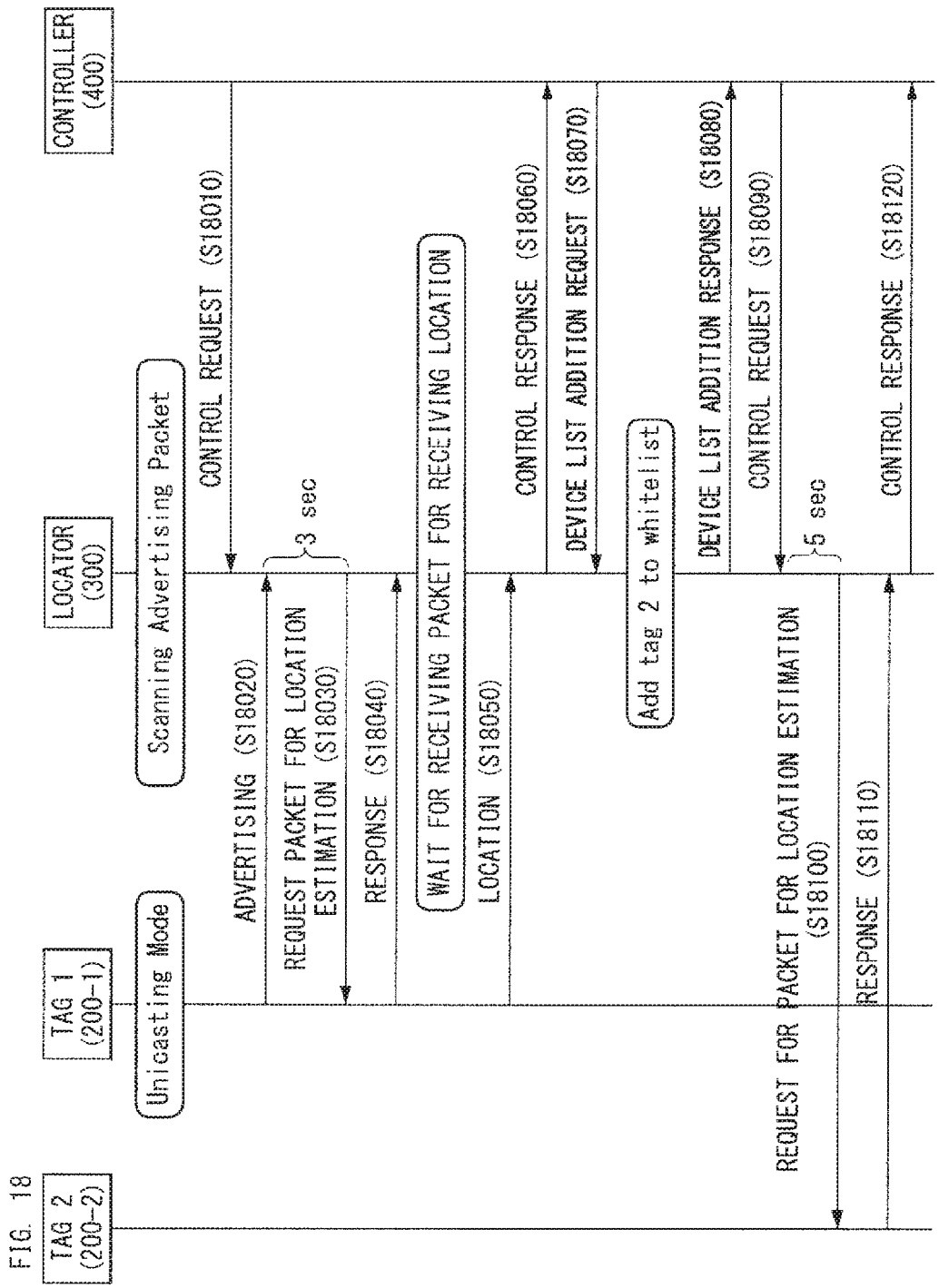
Figure 19:
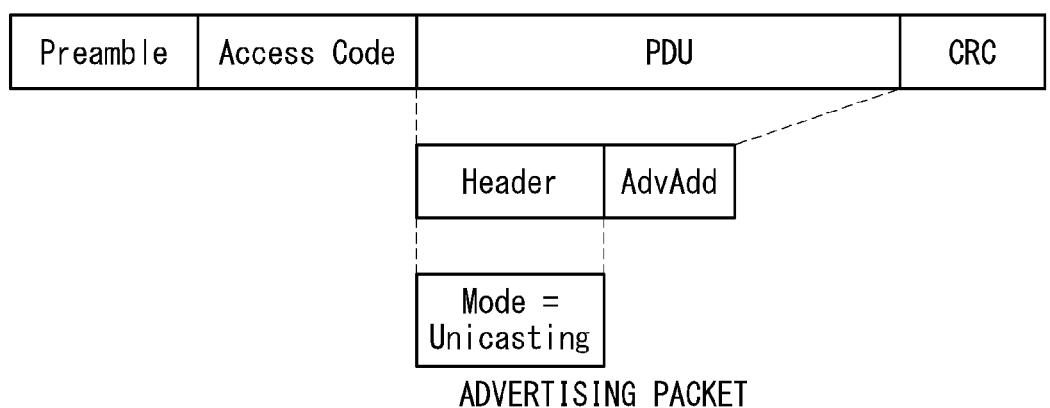

FIGS. 18 to 20 are views illustrating an example of a method for a third device to control a PHD using a BLE technique proposed in this disclosure and a data format.

Referring to FIGS. 18 and 20, the controller transmits a control message or a request message to control an operation of the PCD or obtain information of the PCD or the PHD.

In detail, the PCD 300 may scan an advertising packet or message, and a PHD-1 200-1 may be in a unicast mode.

The controller 400 may transmit a control request message (or a control message) for estimating or measuring a position of the PHD 1 200-1 or controlling the PCD 300 to the PCD 300 (S18010). Here, the advertising message may have such a structure as that of (a) of FIG. 20, and may have a PDU type such as AoA_Track_Device_REQ.

In (a) of FIG. 20, requesting information may include information for the controller 400 to request from the PCD 300.

Table 3 below shows an example of information that may be requested through the requesting information.

TABLE 3

| Information |
| --- |
| Target PCD ID |
| Advertising Duration |
| Scanning Duration |
| Standby Duration |
| Initiating Duration |
| Connection Duration |
| Advertising Type |
| Supported Scanning |
| Locator Control Point |
| Connection Status |
| WhiteList |
| WhiteList Control Point |

TABLE 3-continued

| Information |
|---|
| Bondable |
| Security |
| Update Interval |

Each information represents the same characteristics and same information as those of FIG. 16.

For example, when the controller 400 sets the target PCD ID field to the PHD 1 200-1 and transmits the control request message in which an update interval is 3 sec to the PCD 300, the PCD 300 receives an advertising message from the PHD 1 200-1 (S18020), and after 3 seconds have passed, the controller 400 transmits a packet request message (or a first request message) requesting a packet including location information of the PHD 200 for estimating or measuring a location of the PHD 200 to the PHD 1 200-1 (S18030), and here, a PDU type of the packet request message may be LL_AoA_REQ.

Here, a structure of a data packet of the advertising message is the same as illustrated in FIG. 19, and the packet request message may include interval information requested by the controller.

Thereafter, the PHD 200 may transmit a response message (or a first response message) as a response with respect to the request message, to the PCD 300 (S18040), and here, a PDU type of the response message may be LL_AoA_RSP.

The response message may include information such as an interval at which a packet including the location information is transmitted, channel, and the like.

The response message may have such a structure as that of (b) of FIG. 20, and a determined interval in (b) of FIG. 20 indicates a determined transmission interval of a packet including the location information.

Thereafter, the PCD 300 for location estimation or measurement may wait for on the basis of information included in the response message and receive a location message including the location information transmitted from the PHD 1 200-1 (S18050).

A packet including the location information transmitted from the PHD 200 may be received, and an angle may be calculated using the received location information and/or a packet or a message received through multiple antennas to estimate or measure a location of the PHD 200 according to the method described above with reference to FIG. 6.

Here, the packet may be transmitted in a broadcast manner or unicast manner.

The PCD 300 may transmit a control response message including the estimated or measured location value or location information of the PHD 200 and a determined interval to the controller (S18060). Here, the control response message may have a PDU type such as AoA_Track_Device_RSP.

Thereafter, the controller may transmit a device list additional request message (or a control message) in order to add a PHD 2 200-2 to the whitelist indicating a list of accessible devices of the PCD 300 (S18070). Here, the device list additional request message may have a PDU type of LL_AoA_Track_DeviceList_Add_REQ.

After adding an ID of the PHD 2 200-2 to the whitelist of the PCD, the PCD 300 may include a corresponding result in a device list additional response message and transmit the same to the controller 400 (S18080).

Thereafter, the controller 400 may transmit a control request message (or control message) for estimating or measuring a location of the PHD 2 200-2 or controlling the PCD 300 to the PCD 300 (S18090).

For example, when the controller 400 sets a target PCD ID field to the PHD 2 200-2 and transmits the control request message in which an update interval is 5 sec. to the PCD 300, after 5 sec. has passed since the control request message was received, a packet request message (or a second request message) requesting a packet including location information for estimating or measuring a location to the PHD 2 200-2 (S18100), and here, a PDU type of the packet request message may be LL_AoA_REQ.

Here, a structure of a data packet of the advertising message is the same as that illustrated in FIG. 19, and the packet request message may include interval information requested by the controller.

Thereafter, the PHD 2 200-2 may transmit a response message as a response with respect to the request message to the PCD 300 (S18110), and here, a PDU type of the response message may be LL_AoA_RSP.

The PCD 300 may transmit a control response message including the estimated or measured location value or location information of the PHD 200 and a determined interval to the controller (S18120). Here, the control response message may have the same PDU type as that of AoA_Track_Device_RSP.

Figure 21:
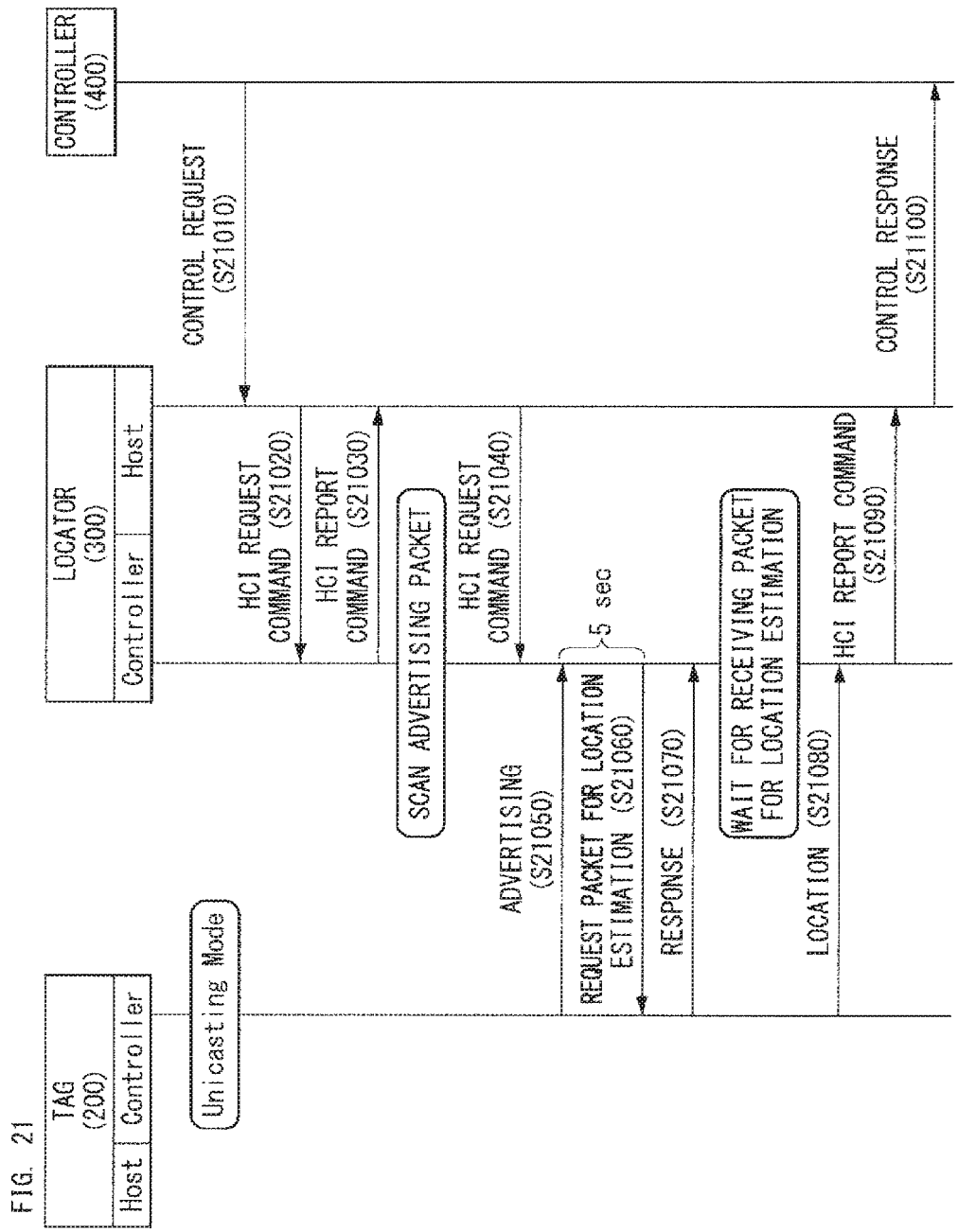

FIGS. 21 and 22 are views illustrating an example of a method for a third device to control a PHD using a BLE technique proposed in this disclosure and a host controller interface (HCI) command.

Referring to FIGS. 21 and 22, the controller may control an operation of the PCD by transmitting a control message or a request message, whereby an interval at which the PCD measures or estimates and reports a location of the PHD and/or a list of devices that can be connected by the PCD may be updated.

In detail, the controller 400 may transmit a control request message (or a control message) for estimating or measuring a location of the PHD 200 and controlling the PCD 300 to the host of the PCD 300 (S21010).

For example, the controller 400 may set the target PCD ID field to an ID of the PHD 200 and transmit the control request message in which an update interval is 5 sec. to the host of the PCD 300.

In order to add the ID of the PHD 200 to the whitelist, a list of device that can be connected by the PCD 300, the host of the PCD 300 transmits an HCI request command to the controller of the PCD 300 (S21020). Here, the HCI request command may be HCI_LE_Send_AoA_Request_Whitelist_Add and may include the parameter illustrated in (a) of FIG. 22.

Upon receiving the HCI request command, the controller of the PCD 300 may add the ID of the PHD 200 to the whitelist, and transmit an HCI report command to the host of the PCD 300 to inform that the whitelist has been updated (S21030). Here, the HCI report command may be HCI_LE_AoA_Report_Event_Whitelist and may include the parameter illustrated in (b) of FIG. 22.

Thereafter, the PCD 300 may enter a scan mode for receiving an advertising message, and the PHD 200 may enter a unicast mode for transmitting an advertising message in a unicast manner.

The host of the PCD 300 may transmit the HCI request command to the controller of the PCD 300 in order to set an interval of estimation or measurement of a location of the PHD 200 (S21040). Here, the HCI request command may be HCI_LE_Send_AoA_Request_Interval, and may include such a parameter as that illustrated in (a) of FIG. 22.

For example, when the interval is set to 5 sec., the PCD 300 receives an advertising message from the PHD 200 (S21050), and after 5 seconds has passed, the PCD 300 may transmit a packet request message (or a request message) requesting a packet including location information for estimating or measuring a location to the PHD 200 (S21060), and here, a PDU type of the packet request message may be LL_AoA_REQ.

Here, a structure of a data packet of the advertising message may be the same as that illustrated in FIG. 19, and the packet request message may include interval information requested by the controller.

Thereafter, the PHD 200 may transmit a response message including a determined interval as a response with respect to the request message to the PCD 300 (S21070), and here, a PDU type of the response message may be LL_AoA_RSP.

The response message may include information such as an interval at which a packet including the location information is transmitted, a channel, and the like.

The response message may have such a structure as that of (b) of FIG. 20, and in (b) of FIG. 20, the determined interval indicates a determined transmission interval of a packet including location information.

Thereafter, the PCD 300 for location estimation or measurement may wait for on the basis of information included in the response message and receive a location message including the location information transmitted from the PHD 200 (S21080).

A packet including the location information transmitted from the PHD 200 may be received, and an angle may be calculated using the received location information and/or a packet or a message received through multiple antennas to estimate or measure a location of the PHD 200 according to the method described above with reference to FIG. 6.

Here, the packet may be transmitted in a broadcast manner or unicast manner.

Upon receiving the location message, the controller of the PCD 300 may transmit an HCI report command to the host of the PCD 300 in order to report the location estimation or measurement result (S21090). Here, the HCI report command may be HCI_LE_AoA_Report_Event, and may include the same parameter as that of (b) of FIG. 22.

Thereafter, the host of the PCD 300 may transmit a control response message including the estimated or measured location value or location information of the PHD 200 and the determined interval to the controller (S21100). Here, the control response message may have a PDU type of AoA_Track_Device_RSP.

FIG. 23 is a view illustrating an example of characteristics of a positioning client device (PCD) proposed in this disclosure.

Referring to FIG. 23, the controller controls an operation of the PHD and obtain information of the PHD through the characteristics of the GATT.

Characteristics illustrated in FIG. 23 are as follows.
LE Enable: It indicates whether a location estimation or measurement function may be enhanced.
PHD Type: It indicates a device type of PHD
Device Manufacturer: It indicates a manufacturer of the PCD
PHD ID/MAC: It indicates an ID or a MAC of PHD
Battery Power: It indicates a remaining battery capacity of the PCD
Tag image: It indicates an image of a tag
Tag Owner Name: It indicates a name of an owner of a tag
Tag Owner ID: It indicates an ID of an owner of a tag FIG. 24 is a view illustrating an example of an indication for providing state information of a PHD proposed in this disclosure.

A PHD status indication of FIG. 24 may provide connection state information of the PHD to the controller as follows.
Only tag of PHD is simply provided
Tag of PHD and connected device information (address of friendly name of peer device) are provided together
Various states (initiating, advertising, scanning) including tag of PHD are provided
Peer device information may be provided together in an initiating state
In an advertising and scanning state, detailed information (adverting/scanning method and operation mode) is provided together
When necessary, information related to connection such as Connected Tech Type, Service Type, Security, Group Info, Battery information may also be provided together Through this method, the controller may obtain information of the PHD 200 through the PCD 300.

Figure 25:
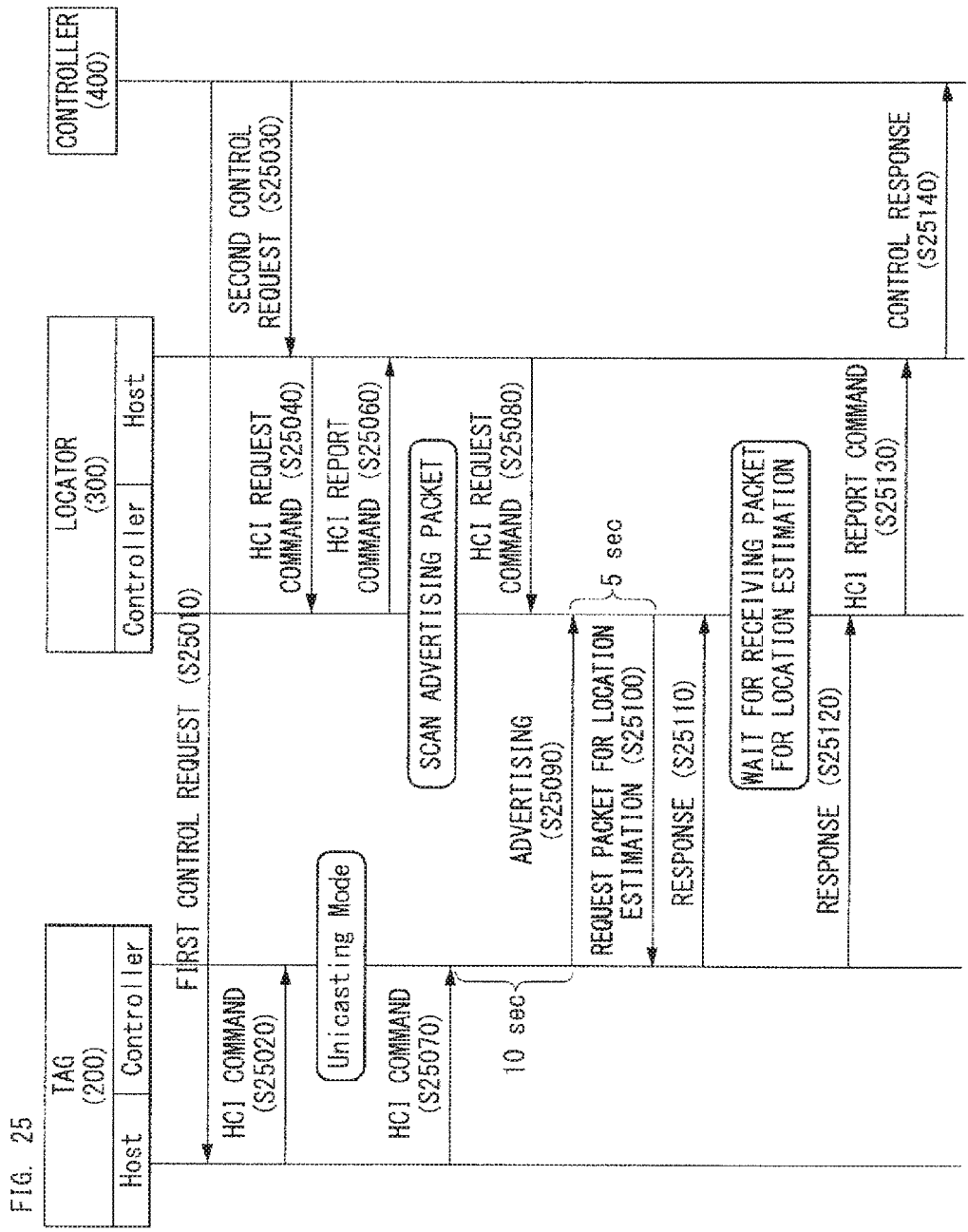

FIGS. 25 and 26 are views illustrating an example of a method for a third device to control a PCD using a BLE technique proposed in this disclosure, and a data format.

In detail, in order to request activation of the PHD 200, the controller 400 may request changing (e.g., "yes") of LE AoA Enable characteristics of a tag illustrated in FIG. 23 (S25010).

Upon receiving the request for changing, the host of the PHD 200 may transmit an HCI command to the PHD 200 to activate a location estimation or location measurement function of the PHD 200 (S25020). Here, the HCI command may be HCI_LE_AoA_Enable and may have such a form as illustrated in (a) of FIG. 26.

When the location estimation or location measurement function is deactivated, the host may transmit the HCI command in the form of HCI_LE_AoA Disable to the controller of the PHD 200.

Thereafter, the PHD 200 enters a unicast mode to transmit an advertising message in a unicast manner.

Hereinafter, steps S25030 to S25060 are the same as steps S21010 to S21030 of FIG. 21, and thus, descriptions thereof will be omitted.

The host of the PHD 200 may transmit an HCI request command to the controller of the PCD 300 in order to set a transmission interval of an advertising message (S25070). Here, the HCI request command may be an HCI_LE_Send_AoA_Updata_Interval and may include such a parameter as that illustrated in (a) of FIG. 26.

For example, when the interval is set to 10 sec., the controller of the PHD 200 may transmit an advertising message to the PCD 300 after 10 sec. has passed since the HCI command was received from the host.

The host of the PCD 300 may transmit an HCI request command to the controller of the PCD 300 in order to set a location estimation or measurement interval (S25080). Here, the HCI request command may be HCI_LE_Send_AoA_Request_Interval and may include such a parameter as that illustrated in (a) of FIG. 22.

For example, when the interval is set to 5 sec., the PCD 300 may receive an advertising message from the PHD 200 (S25090), and after 5 sec. has passed, the PCD 300 may transmit a packet request message (or request message) requesting a packet including location information for estimating or measuring a location to the PHD 200 (S25100), and a PDU type of the packet request message may be LL_AoA_REQ.

Here, a structure of the data packet of the advertisement message is the same as that illustrated in FIG. 19, and the packet request message may include interval information requested by the controller.

Hereinafter, steps S25110 to S25140 are the same as steps S21070 to S21100 of FIG. 21, and thus, descriptions thereof will be omitted.

The above-described present invention is not limited to the above-described embodiments and the accompanying drawings because those having ordinary skill in the technical field to which the present invention pertains can make various replacements, variations and modifications within the range which does not depart from the technical spirit of the invention.

The invention claimed is:

1. A method for estimating a position of a first device by a third device using a Bluetooth low energy (BLE), the method, being performed in a second device, comprising:
receiving an additional request message from the third device requesting addition of an ID indicating the first device to a list information;
adding the ID to the list information based on the additional request message;
receiving a position measurement request message requesting measurement of the position of the first device from the third device;
transmitting a first request message requesting activation of a position measurement function for measuring the position of the first device to the first device;
receiving a first response message in response to the first request message from the first device;
calculating an angle with the first device based on the first response message;
estimating position value information indicating the position of the first device based on the calculated angle; and
transmitting a position measurement response message including the estimated position value information to the third device,
wherein the list information indicates a list of devices from which the second device can measure the position.

2. The method of claim 1,
wherein the position measurement request message includes at least one of the ID, address information, or type information indicating a type of the first device, and
wherein the position value information includes at least one of latitude information, longitude information, altitude information for the first device, or transmission signal strength information indicating strength of a transmitted signal.

3. The method of claim 1, wherein the position measurement request message is transmitted in a unicast method or broadcast method.

4. The method of claim 3, further comprising:
when the position measurement request message is transmitted in the unicast method, receiving a connection request message for Bluetooth connection from the third device; and
establishing Bluetooth connection with the third device based on the connection request message.

5. The method of claim 1, further comprising:
receiving a control message for requesting a specific operation from the third device to the second device;
performing the specific operation based on the control message; and
transmitting a second response message in response to the control message to the third device.

6. The method of claim 5, wherein the specific operation is an operation of setting an interval at which the request message is transmitted.

7. The method of claim 1, further comprising:
receiving a second request message requesting connection information or state information of the second device from the third device; and
transmitting a second response message including at least one of the connection information or state information as a response with respect to the second request message to the third device.

8. The method of claim 1, further comprising:
receiving a control message for requesting a specific operation from the third device to the first device; and
transmitting the control message to the first device.

9. A device, as a second device in which a third device estimates a position of a first device using Bluetooth low energy (BLE), the device comprising:
a communication unit communicating wirelessly or wiredly; and
a processor functionally connected to the communication unit,
wherein the processor is configured to:
receive an additional request message from the third device requesting additional of an ID indicating the first device to list information,
add the ID to the list information based on the addition request message,
receive a position measurement request message requesting measurement of the position of the first device from the third device;
transmit a first request message requesting activation of a position measurement function for measuring the position of the first device to the first device;
receive a first response message in response to the first request message from the first device;
calculate an angle with the first device based on the first response message;
estimate position value information indicating the position of the first device based on the calculated angle; and
transmit a position measurement response message including the estimated position value information to the third device,
wherein the list information indicates a list of devices from which the second device can measure the position.

10. The device of claim 9,
wherein the position measurement request message includes at least one of the ID, address information, or type information indicating a type of the first device, and
wherein the position value information includes at least one of latitude information, longitude information, altitude information for the first device, or transmission signal strength information indicating strength of a transmitted signal.

11. The device of claim 10, wherein the position measurement request message is transmitted in a unicast method or broadcast method.

12. The device of claim 11, wherein when the position measurement request message is transmitted in the unicast method, the processor is further configured to:
- receive a connection request message for Bluetooth connection from the third device; and
- establish Bluetooth connection with the third device based on the connection request message.

13. The device of claim 10, wherein the processor is further configured to:
- receive a second request message requesting connection information or state information of the second device from the third device; and
- transmit a second response message including at least one of the connection information or state information as a response with respect to the second request message to the third device.

14. The device of claim 10, wherein the processor is further configured to:
- receive a control message for requesting a specific operation from the third device to the first device; and
- transmit the control message to the first device.

15. The device of claim 9, wherein the processor is further configured to:
- receive a control message for requesting a specific operation from the third device to the second device;
- perform the specific operation based on the control message; and
- transmit a second response message in response to the control message to the third device.

16. The device of claim 15, wherein the specific operation is an operation of setting an interval at which the request message is transmitted.

* * * * *